(12) United States Patent
Shishido

(10) Patent No.: US 7,417,928 B2
(45) Date of Patent: *Aug. 26, 2008

(54) OPTICALLY RECORDED DATA DISCRIMINATION APPARATUS AND ASSOCIATED METHODOLOGY

(75) Inventor: Yukio Shishido, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/022,699

(22) Filed: Dec. 28, 2004

(65) Prior Publication Data

US 2005/0135213 A1   Jun. 23, 2005

Related U.S. Application Data

(63) Continuation of application No. 09/926,192, filed as application No. PCT/JP01/00389 on Jan. 22, 2001, now Pat. No. 6,985,420.

(30) Foreign Application Priority Data

Jan. 21, 2000 (JP) ............................... 2000-13398

(51) Int. Cl.
G11B 5/58 (2006.01)
G11B 7/00 (2006.01)

(52) U.S. Cl. ................................... 369/53.16
(58) Field of Classification Search ........................ None
See application file for complete search history.

(56) References Cited

U.S. PATENT DOCUMENTS 5,289,451 A   2/1994   Ashinuma et al.
5,329,510 A   7/1994   Tsuyuguchi et al.
5,355,355 A * 10/1994   Ohshima et al. .............. 369/14

(Continued)

FOREIGN PATENT DOCUMENTS

JP   1-294276   11/1989

(Continued)

OTHER PUBLICATIONS

Machine translation of Fujinawa (JP 08-102140).*

(Continued)

Primary Examiner—Joseph Feild
Assistant Examiner—Peter Vincent Agustin
(74) Attorney, Agent, or Firm—Oblon, Spivak, McClelland, Maier & Neustadt, P.C.

(57) ABSTRACT

The requested data is read from a DVD disk by interruption in ST46. Then, the ID information for indicating the leading end of the data, and the result of the identification by use of the EDC for indicating whether or not the data is correct are stored in ST47. When the disk is identified as a DVD-video disk and the flag is set in ST 48, and also when the number of times N of retries is identified as being larger than NR in ST50 and the read data is not identified as control data in ST51, data transmission is performed. When no flag is set, the disk identification is performed based on whether or not the data at a predetermined position on the logical format has predetermined data in ST49. When it is identified that an error has been detected in ST52 and also when the number of times N of retries becomes larger than NS in ST53, the occurrence of an error is announced.

2 Claims, 18 Drawing Sheets

U.S. PATENT DOCUMENTS

| | | | |
|---|---|---|---|
| 5,513,162 A | 4/1996 | Kishi et al. | |
| 5,544,137 A | 8/1996 | Ohara et al. | |
| 5,896,355 A * | 4/1999 | Sako et al. | 369/47.24 |
| 6,016,293 A | 1/2000 | Lee et al. | |
| 6,072,759 A * | 6/2000 | Maeda et al. | 369/59.25 |
| 6,147,941 A | 11/2000 | Kumagai | |
| 6,295,260 B1 | 9/2001 | Shihara et al. | |
| 6,434,326 B1 * | 8/2002 | Kondo et al. | 386/125 |
| 6,628,590 B1 | 9/2003 | Matsuo et al. | |
| 6,985,420 B2 * | 1/2006 | Shishido | 369/53.37 |

FOREIGN PATENT DOCUMENTS

| | | |
|---|---|---|
| JP | 5-307753 | 11/1993 |
| JP | 7-272402 | 10/1995 |
| JP | 8-102140 | 4/1996 |
| JP | 8-329472 | 12/1996 |
| JP | 9-134572 | 5/1997 |
| JP | 9-306088 | 11/1997 |
| JP | 2002-215121 | 7/2002 |

OTHER PUBLICATIONS

English translation of JP 09306088 A.
English translation of JP 08102140 A.
English translation of JP 09306088 A, published Nov. 28, 1997.
English translation of JP 08102140 A, published Apr. 16, 1996.

* cited by examiner

PHYSICAL SECTOR NUMBER
(EXPRESSED BY HEXADECIMAL NOTATION)

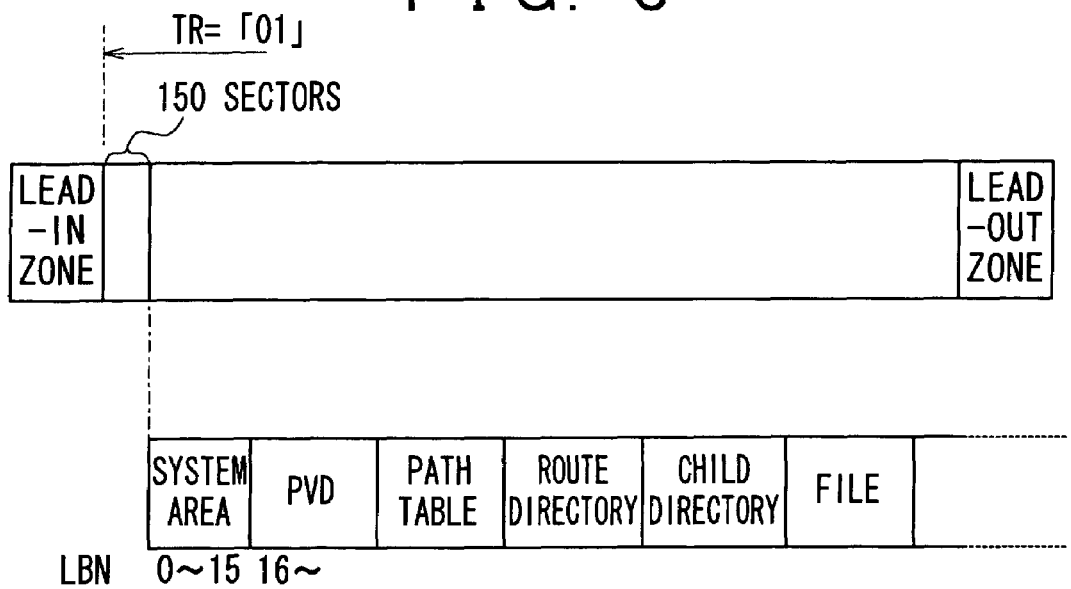
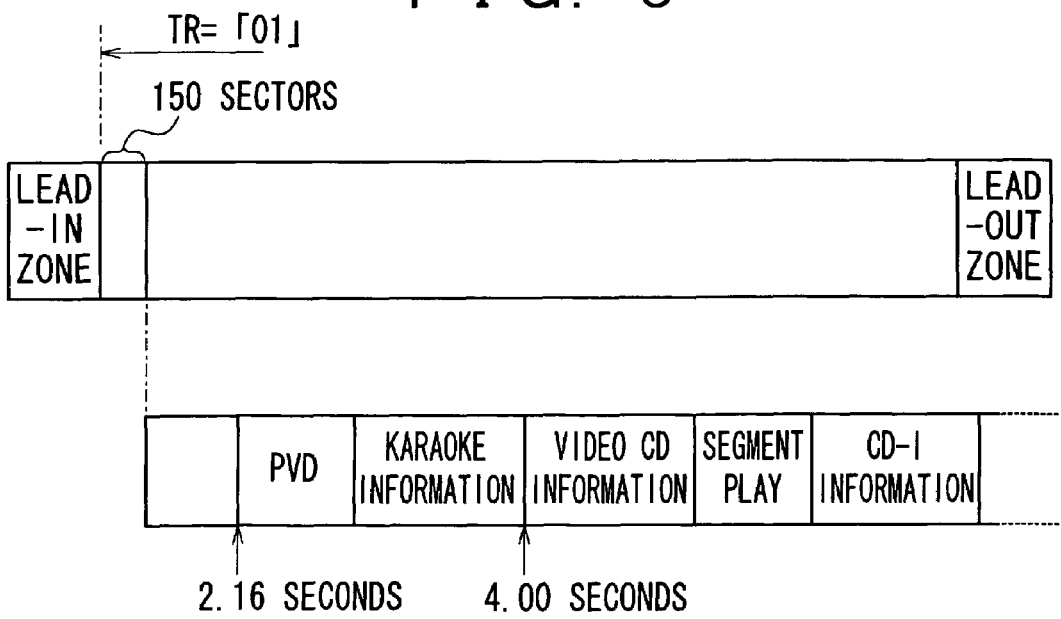

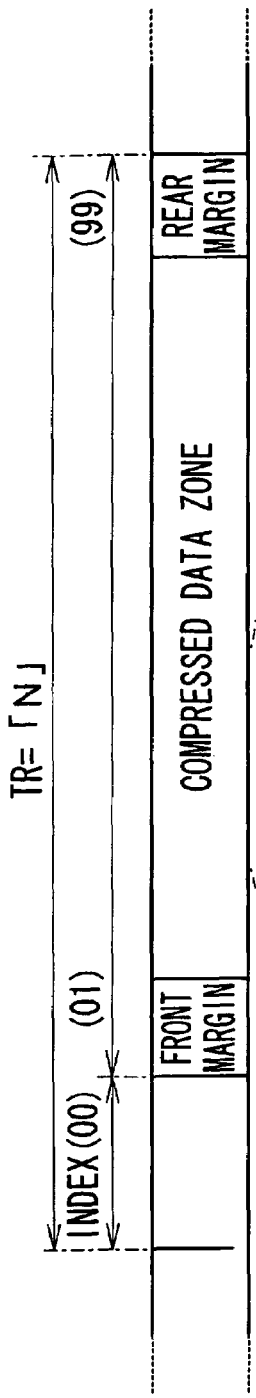
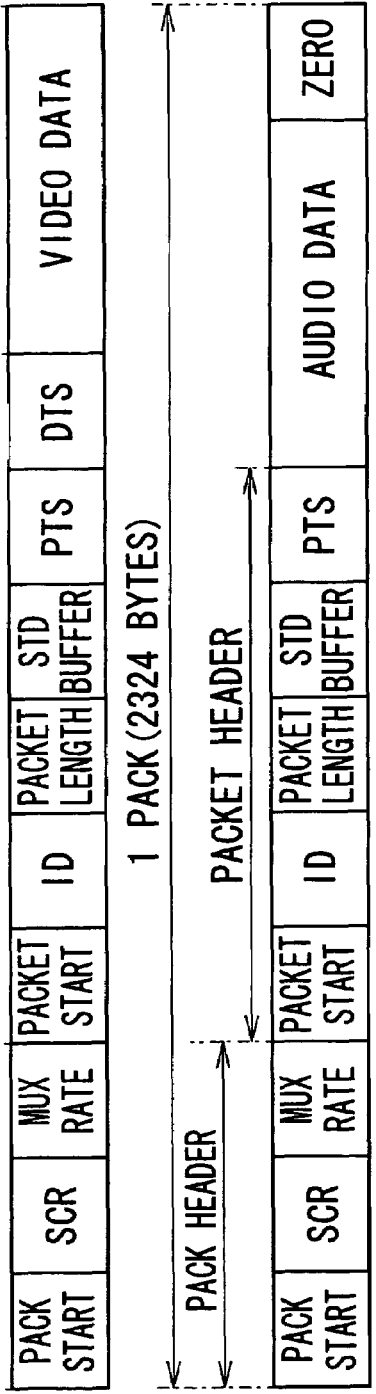
FIG. 7A
FIG. 7B
FIG. 7C
FIG. 7D

FIG. 14A

DATA IN SECTOR AT 4.00 SECONDS

```
    +0 +1 +2 +3 +4 +5 +6 +7 +8 +9 +A +B +C +D +E +F  0123456789ABCDEF
    00 04 00 02 00 00 89 00 00 00 89 00 56 49 44 45  ............VIDE
    4F 5F 43 44 01 01 41 4C 42 55 4D 30 32 20 20 20  O_CD__ALBUM02
    20 20 20 20 01 01 20 20 00 01 00 00 00 00 00 00  ................
    00 00 00 00 00 00 00 00 00 00 00 00 00 00 00 00  ................
    00 00 00 00 00 00 00 00 00 00 00 00 00 00 00 00  ................
```

FIG. 14B

DATA IN SECTOR AT 4.00 SECONDS

```
    +0 +1 +2 +3 +4 +5 +6 +7 +8 +9 +A +B +C +D +E +F  0123456789ABCDEF
    00 04 00 02 00 01 88 00 00 01 88 00 56 49 44 45  ............VIDE
    4F 5F 43 44 01 01 74 72 61 64 31 30 30 20 20 20  O_CD__trad100
    20 20 20 20 01 01 20 20 00 01 00 00 00 00 00 00  ................
    00 00 00 00 00 00 00 00 00 00 00 00 00 00 00 00  ................
    00 00 00 00 00 00 00 00 00 00 00 00 00 00 00 00  ................
```

FIG. 17

| LSN | Descriptors | Structure |
|---|---|---|
| 0to15 | Reserved(all 00h bytes) | |
| 16 | Primary Volume Descriptor(ISO9660) | UDF Bridge Volume Recognition Sequence |
| 17 | Volume Descriptor Set Terminator | |
| 18 | Beginning Extended Area Descriptor | |
| 19 | NSR Descriptor | |
| 20 | Terminating Extended Area Descriptor | |
| 21to31 | Reserved(all 00h bytes) | |
| 32 | Primary Volume Descriptor(UDF) | Main Volume Descriptor Sequence |
| 33 | Implementation Use Volume Descriptor | |
| 34 | Partition Descriptor | |
| 35 | Logical Volume Descriptor | |
| 36 | Unallocated Space Descriptor | |
| 37 | Terminating Descriptor | |
| 38to47 | Trailing Logical Sectors(all 00h bytes) | |
| 48 | Primary Volume Descriptor(UDF) | Reserve Volume Descriptor Sequence |
| 49 | Implementation Use Volume Descriptor | |
| 50 | Partition Descriptor | |
| 51 | Logical Volume Descriptor | |
| 52 | Unallocated Space Descriptor | |
| 53 | Terminating Descriptor | |
| 54to63 | Trailing Logical Sectors(all 00h bytes) | |
| 64 | Logical Volume Integrity Descriptor | Logical Volume Integrity Sequence |
| 65 | Terminating Descriptor | |
| 66to255 | Reserved(all 00h bytes) | |
| 256 | Anchor Volume Descriptor Pointer | First Anchor Point |
| 257 to p-1 | Path Table/Directory Record | ISO9660 File Structure |
| p to p+q-1 | File Set Descriptor/Terminating Descriptor/File Identifier Descriptor/File Entry | UDF File Structure |
| p+q-1 to Last LSN-1 | UDF/ISO9660 Files | File Data Structure |
| Last LSN | Anchor Volume Descriptor Pointer | Second Anchor Point | p, q: LOGICAL SECTOR ADDRESS

FIG. 22

|  | +0 +1 +2 +3 +4 +5 +6 +7 +8 +9 +A +B +C +D +E +F | 0123456789ABCDEF |
|---|---|---|
| 30100h | 20 03 01 00 D1 F3 00 00 00 00 00 00 02 00 02 00 | ................ |
| PHYSICAL SECTOR NUMBER | CF 00 01 00 01 D7 F0 01 00 01 00 00 00 80 00 00 | ................ |
|  | 20 00 00 00 00 80 00 00 30 00 00 00 00 00 00 00 | ........0....... |
|  | 00 00 00 00 00 00 00 00 00 00 00 00 00 00 00 00 | ................ |
|  | 00 00 00 00 00 00 00 00 00 00 00 00 00 00 00 00 | ................ |
|  | 00 00 00 00 00 00 00 00 00 00 00 00 00 00 00 00 | ................ |
|  | 00 00 00 00 00 00 00 00 00 00 00 00 00 00 00 00 | ................ |
|  | 00 00 00 00 00 00 00 00 00 00 00 00 00 00 00 00 | ................ |
|  | 00 00 00 00 00 00 00 00 00 00 00 00 00 00 00 00 | ................ |
|  | 00 00 00 00 00 00 00 00 00 00 00 00 00 00 00 00 | ................ |
|  | 00 00 00 00 00 00 00 00 00 00 00 00 00 00 00 00 | ................ |
|  | 00 00 00 00 00 00 00 00 00 00 00 00 00 00 00 00 | ................ |
|  | 00 00 00 00 00 00 00 00 00 00 00 00 00 00 00 00 | ................ |
|  | 00 00 00 00 00 00 00 00 00 00 00 00 00 00 00 00 | ................ |
| 30110h | 20 03 01 01 D2 F1 00 00 00 00 00 00 01 00 03 01 | ................ |
|  | 00 00 01 00 00 00 08 00 04 01 00 00 01 00 41 55 | ..............AU |
|  | 44 49 4F 5F 54 53 08 00 05 01 00 00 01 00 56 49 | DIO_TS........VI |
|  | 44 45 4F 5F 54 53 00 00 00 00 00 00 00 00 00 00 | DEO_TS.......... |
|  | 00 00 00 00 00 00 00 00 00 00 00 00 00 00 00 00 | ................ |
|  | 00 00 00 00 00 00 00 00 00 00 00 00 00 00 00 00 | ................ |
|  | 00 00 00 00 00 00 00 00 00 00 00 00 00 00 00 00 | ................ |
|  | 00 00 00 00 00 00 00 00 00 00 00 00 00 00 00 00 | ................ |
| 30120h | 20 03 01 02 D7 F7 00 00 00 00 00 00 01 00 00 00 | ................ |
|  | 01 03 00 01 00 00 08 00 00 00 01 04 00 01 41 55 | ..............AU |
|  | 44 49 4F 5F 54 53 08 00 00 00 01 05 00 01 56 49 | DIO_TS........VI |
|  | 44 45 4F 5F 54 53 00 00 00 00 00 00 00 00 00 00 | DEO_TS.......... |
|  | 00 00 00 00 00 00 00 00 00 00 00 00 00 00 00 00 | ................ |
|  | 00 00 00 00 00 00 00 00 00 00 00 00 00 00 00 00 | ................ |
|  | 00 00 00 00 00 00 00 00 00 00 00 00 00 00 00 00 | ................ |

OPTICALLY RECORDED DATA DISCRIMINATION APPARATUS AND ASSOCIATED METHODOLOGY

CROSS-REFERENCE TO RELATED APPLICATIONS

This application is a continuation of U.S. application Ser. No. 09/926,192, filed Jan. 28, 2002 now U.S. Pat. No. 6,985,420, which is the national stage of Application No. PCT/JP01/00389, filed Jan. 22, 2001, and is based upon and claims the benefit of priority from Japanese Patent Application No. 2000-13398, filed Jan. 21, 2000, the entire contents of each of which is incorporated herein by reference.

BACKGROUND OF THE INVENTION

1. Field of the Invention

The present invention relates to a method for identifying optical disks suitable for the case of using plural kinds of optical disks having physical specifications identical to each other, a method for reproducing optical disks, and an optical disk apparatus.

2. Description of the Related Art

In recent years, as technology relating to optical disks progresses, there have been suggested optical disks having physical specifications identical to each other, and having contents of recorded signals different from each other. For example, as a compact disk, on top of a CD-DA in which music data is recorded, also suggested are disks such as a CD-ROM in which computer data and the like is recorded, and a video CD (i.e. a compact disk) in which images (i.e. video images), sounds, and the like are recorded. In addition, as an optical disk called as a digital versatile disk (DVD) which has a high recording capacity attained by giving a recording density higher than that of a compact disk, suggested are a DVD-ROM in which computer data is recorded, a DVD-Video in which images and sounds of movies are recorded, and the like.

A CD-ROM is constituted by giving a CD-DA an ability of recording an error correction code into the data zone of the sector, and by use of the error correction data, the CD-ROM has an increased ability of error correction as compared with the CD-DA. In this structure, when a CD-ROM decoding circuit for performing error correction using the above-described error correction code is provided to a disk reproducing apparatus for obtaining a reproduction output signal by reading a signal recorded in the CD-DA and then by demodulating the read signal, both the CD-DA and the CD-ROM can be reproduced in a single disk reproducing apparatus. The video CD records video and audio data compressed in compliance with the Moving Picture Experts Group (MPEG) 1 standards, by use of a physical format of the CD-ROM XA which has been established by expanding the CD-ROM standards. In this structure, when an MPEG decoder circuit for decoding the compressed data is further provided to the disk reproducing apparatus, not only a CD-CA and a CD-ROM but also a video CD can be reproduced in a single disk reproducing apparatus.

In a disk reproducing apparatus for reproducing a DVD disk similarly, when an MPEG decoder circuit for decoding video and audio data compressed in compliance with the Moving Picture Experts Group (MPEG) 2 standards is provided to a DVD-ROM disk reproducing apparatus for obtaining a reproduction output signal by reading a signal recorded in the disk and then by performing demodulation and error correction for the signal, not only a DVD-ROM disk but also a DVD-Video disk can be reproduced in a single disk reproducing apparatus.

In the above-described optical disks, in the cases where the optical disks themselves have defects, where scratches are created on the optical disks, or where dusts are attached on the optical disks, possibilities arise that the data recorded therein may not be read correctly, due to the influences of the defects, scratches, dusts, and the like. If such troubles occur in the case where the recorded data is computer data, it is desirable to repeat retry where the recorded data is read again, so as to obtain data as correct as possible. However, if the recorded data is video data or audio data, and the retry is repeated in an attempt to obtain correct data, the period in which the data is not read become longer, resulting in discontinuity of the images and sounds.

In such situations, the present invention provides a method for identifying optical disks in which the kind of data recorded in each of the optical disks is identified and a reproducing operation is performed in accordance with each of the optical disks, a method for reproducing optical disks, and an optical disk apparatus.

SUMMARY OF THE INVENTION

A method for identifying optical disks of the present invention includes the step of: in a state where each the optical disks is reproduced, performing identification of the optical disk, based on whether or not data at a predetermined position on a logical format in a data zone has predetermined data.

Each of the optical disks is reproduced in a predetermined sequence, and the identification of the optical disk is performed when the data at the predetermined position on the logical format is reproduced.

The data at the predetermined position is data in a unit of block, and the predetermined data is data of a error correction code completed within the block.

The data at the predetermined position is data in a predetermined file structure recorded in each of the optical disks, and the predetermined data is data related to contends of the recorded data.

A method for reproducing optical disks according to the present invention includes the steps of: performing identification of each of the optical disks, based on whether or not data at a predetermined position on a logical format in a data zone obtained by reproducing the optical disk has predetermined data; and controlling a reproducing operation based on a result of the identification.

When an error is detected in the data obtained by reproducing each of the optical disks, a processing for responding to the error detection is switched based on the result of the identification.

Retry for reading data from each of the optical disks again is performed in the processing for responding to the error detection. The number of times of the retries or the period of time for the retries performed until correct data is obtained is switched based on the result of the identification. When the data in which an error has been detected is control data related to an operation, the switching of the processing for responding to the error detection is cancelled.

A speed of reading data from each of the optical disks or an amount of data read from each of the optical disks beforehand is switched based on the result of the identification.

An optical disk apparatus according to the present invention includes: data reading means for, in a state where each of optical disks is reproduced, reading data recorded therein; and control means for identifying the optical disk based on whether or not data which has been obtained by the data reading means and is located at a predetermined position on a logical format in a data zone has predetermined data, and for performing control on an operation in accordance with a result of the identification.

The optical disk apparatus includes: error detection means for detecting an error of the data obtained by the data reading means, wherein when the error is detected by the error detection means, the control means switches processing for responding to the error detection based on the result of the identification.

The control means controls the data reading means based on the result of the identification in such a manner as to switch a speed at which data is reading from each of the optical disks, or controls the data reading means in such a manner as to switch an amount of data to be read forehand from each of the optical disks, based on the result of the identification.

BRIEF DESCRIPTION OF THE DRAWINGS

FIG. 5 is a diagram showing a disk structure of a CD-ROM.
FIG. 6 is a diagram showing a disk structure of a video CD.
FIGS. 7A to 7D are diagrams each for illustrating compressed data to be recorded in a truck.
FIGS. 14A and 14B are diagrams each showing an example of data read from the sector at the position of 4.00 seconds.
FIG. 17 is a diagram showing a directory structure.
FIG. 22 is a diagram showing a part of the data stored in a RAM.

DETAILED DESCRIPTION OF THE PREFERRED EMBODIMENTS

Figure 1:
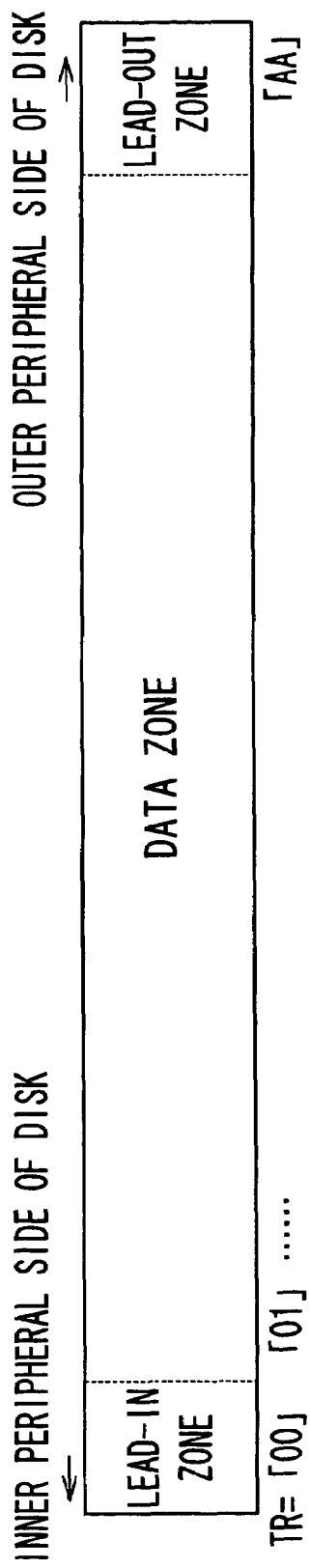
FIG. 1 is a diagram showing a structure of a compact disk.

Hereinafter, the present invention will be described with reference to the drawings. FIG. 1 is a diagram showing a structure of an optical disk, for example, of a compact disk. At an inner peripheral side of the disk, a lead-in zone is formed, and at an outer peripheral side thereof, a lead-out zone is formed. The zone between the lead-in zone and the lead-out zone is a data zone.

Figure 2:
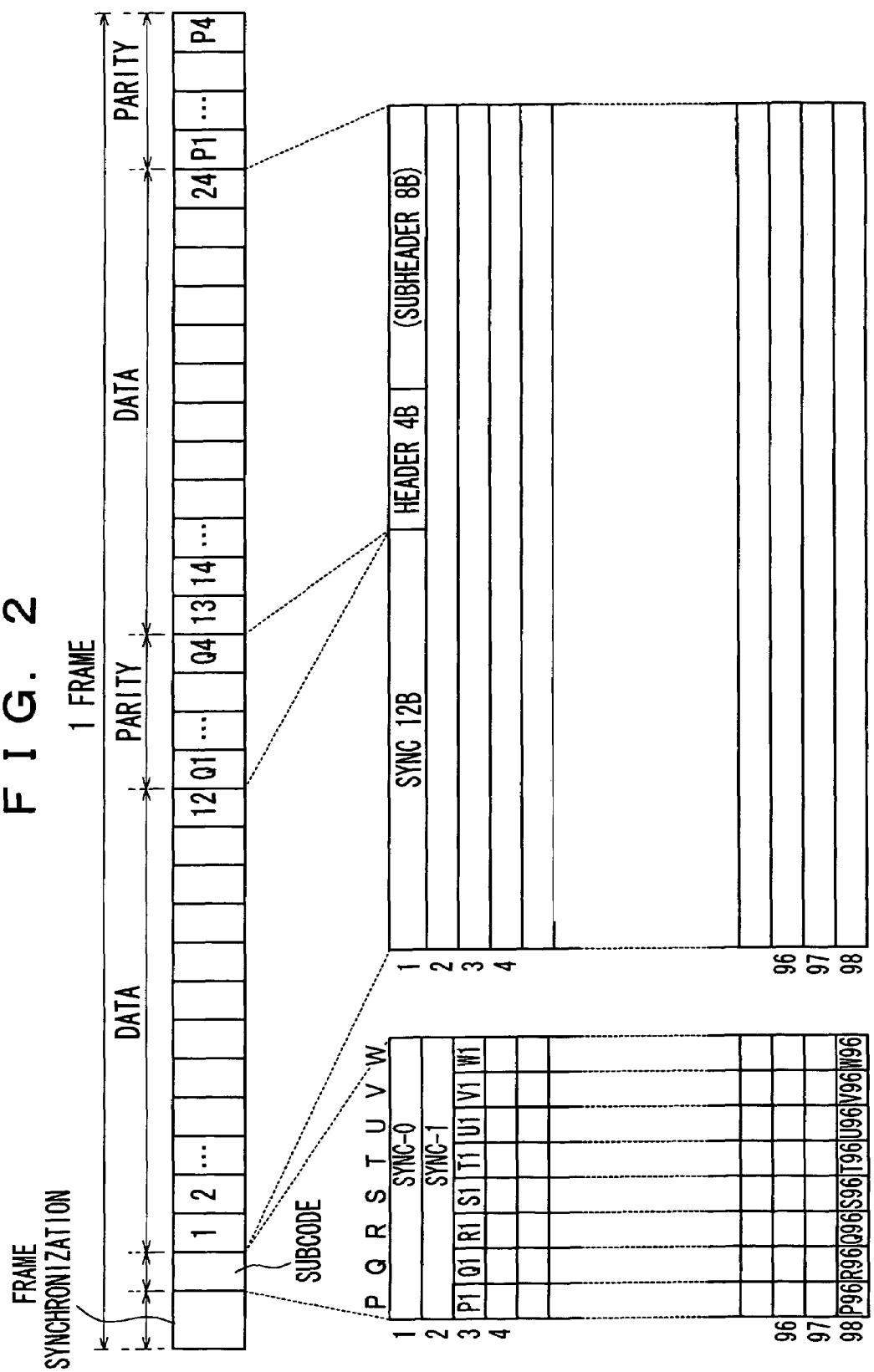
FIG. 2 is diagram showing a frame structure of a CD signal.

Here, one frame of a CD signal recorded in the compact disk is constituted by a frame synchronous signal and a subcode, and data and a parity, as shown in FIG. 2. The subcode is in 8 bits from P channels to W channels, and one subcode frame is constituted by the CD signal of 98 frames. In the subcode frame, first two CD signal frames are defined as a synchronous signal first Sync-0 and Sync-1, and the remaining 96 frames are used to indicate information.

Figure 3:
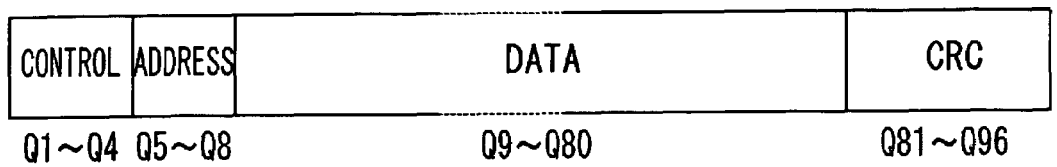
FIG. 3 is a diagram showing a structure of a subcode Q.

As shown in FIG. 3, the Q channels of the subcode (hereinafter, referred to as a "subcode Q") include a control field (Q0 to Q4), an address field (Q4 to Q7), a data field (Q9 to Q80), and a CRC field (Q81 to Q96).

The control field shows information for identifying whether the recorded signal is audio data or digital data, information for identifying the number of audio channels, information whether an emphasis is present or absent, and the like. For example, for the 2-channel audio having no pre-emphasis, its control field is defined as (0000). For a disk in which digital data is recorded, for example, in a CD-ROM, its control field is defined as (01×0 (where x is 0 or 1).

The address field shows the contents of information that the data field subsequent to the address field has. The data field shows information associated with the address field. For example, when the address field is defined as (0001), the data field shows a truck number, an elapsed time, an absolute time, and the like. When the address field is defined as (0011), the data field shows an international standard recording code (an ISR code). The CRC field is provided with parity bits. In the lead-in zone shown in FIG. 1, the truck number TR indicated by the data field is defined as "00", while in the lead-out zone, the truck number TR is defined as "AA".

When the compact disk is a CD-ROM, as shown in FIG. 2, the data zone is arranged to include the CD signal of 98 frames, that is, 2352 bytes are set to 1 block, and the signal is recorded in units of these blocks.

In the CD-ROM, as shown in FIG. 4, the data structure within the block is categorized into three modes from mode 0 to mode 2, depending on the kind of the data to be recorded. The mode 0 shown in FIG. 4A is used as a dummy block in the case where the lead-in zone and the lead-out zone are provided with the CD-ROM structure. A first 12 byte-area in the block constitutes a synchronous signal for sorting the block, and a next 4 byte-area is used as a header area. The remaining 2336 byte-area is entirely defined as "0".

Figure 4A:
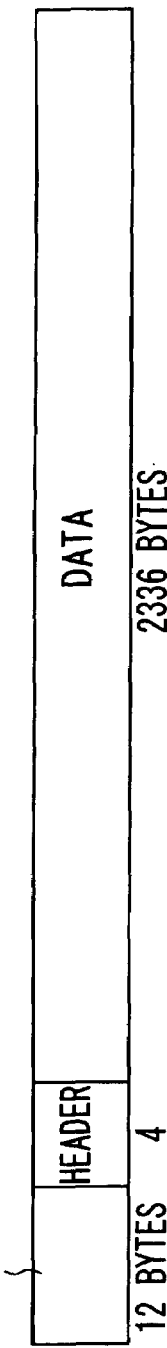
FIGS. 4A to 4D are diagrams each showing a data structure in a block.
Figure 4B:
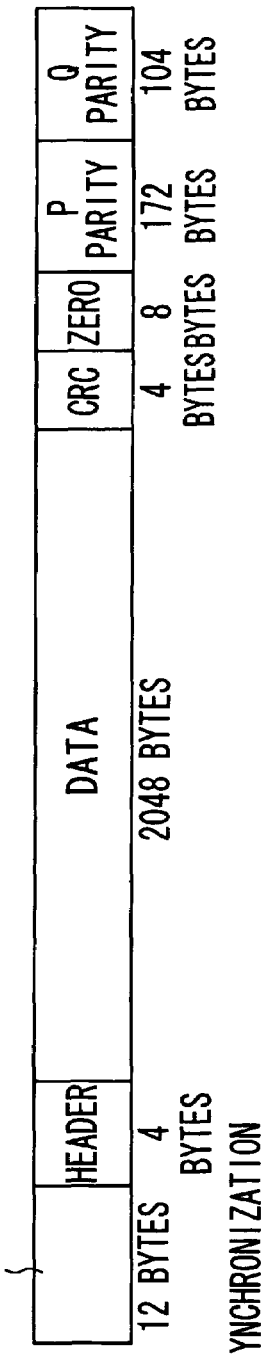
Figure 4C:
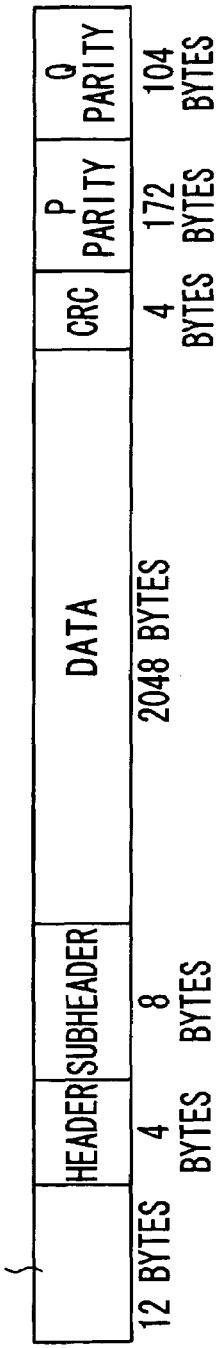
Figure 4D:
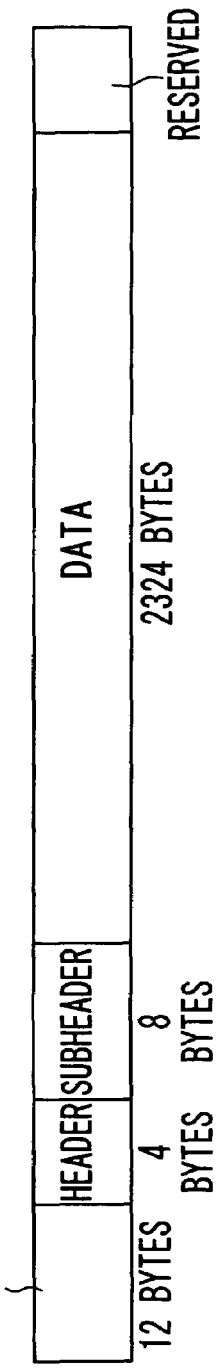

The mode 1 shown in FIG. 4B is used for recording data. The 2048 byte-area subsequent to the header area is used as a user data area. A remaining 288 byte-area is used as an auxiliary data area in which an error correction code completed within the block is recorded. Specifically as shown in FIG. 4B, a cyclic redundancy code (CRC) which is an error detection code, and a parity which is an error correction code are recorded in the auxiliary data area, so as to enable the error detection and correction in the 2340 byte-area except for the synchronous signal. In this manner, not only the cross interleave reed-solomon code (CIRC) but also the error correction code completed within the block (layered ECC) are provided, resulting in decreasing the bit error ratio to about 10-12.

In the mode 2, the 2336 byte-area subsequent to the header area is opened as a user data area. In the CD-ROM XA standards which enable interleave between computer data and video or audio data, a form 1 and a form 2 are prepared for the mode 2. In the form 1 of the mode 2 shown in FIG. 4C, the 8 byte-area subsequent to the header area is defined as a subheader area, and the 2048 byte-area subsequent to the subheader area is defined as a data area into which computer data is recorded. A 280 byte-area subsequent to the data area is defined as an auxiliary data area into which an error correction code completed within the block is recorded. In the form 2 of the mode 2 shown in FIG. 4D, an 8 byte-area subsequent to the header area is defined as a subheader area, and the 2324 byte-area subsequent to the subheader area is defined as a data area for video and audio data. A 4 byte-area subsequent to the data area is defined as a reserved area.

In the CD-ROM, in order that the recorded data can be read without depending on the operating system of the computer apparatus, a disk structure shown in FIG. 5 and standardized as the international organization for standardization (ISO) 9660 is employed.

In the data zone provided between the aforementioned lead-in zone and the lead-out zone, the data of the information to be recorded is provided with logical block numbers (LBNs) in units of 2 k bytes. The position of the first LBN "0" is defined as a position where the pregap of 150 sectors (corresponding to 2 seconds of audio) have passed from the end position of the lead-in zone.

Since an area with LBNs "0" to "15" is used as system areas, the area of the data recorded in the CD-ROM starts from LBN "16".

In the area starting from LBN "16" and thereafter, a primary volume descriptor (PVD) is recorded. In the volume descriptor of PVD, recorded are information for identifying the type of volume descriptor and the file format, and information required for reproducing the recorded data such as the size of the logical block (LB), the size and address of "Path Table", and "root directory record".

Subsequent of the PVD, recorded are a path table for indicating the leading end of the directory file and a directory for indicating the leading position of the file and the like.

Next, description will be made on a video CD in which recorded is data including the contents such as images and sounds and being compressed in compliance with the moving picture experts group 1 standards in the format of the CD-ROM XA standards.

In the video CD, as shown in FIG. 6, the area with the truck number TR="01" subsequent to the lead-in zone includes a PVD and a Karaoke information section, a video CD information section, a segment play section, and a CD-I application section. In the area with the truck number TR="02" and thereafter, video and audio signals are recorded in a compressed state. In the area with the truck number TR="01", data is recorded in the form 1 of the mode 2, and in the area with the truck number TR="02" and thereafter, compressed data is recorded in the form 2 of the mode 2.

The video CD information section is an area in which various kinds of disk information and the like are recorded, and is constituted by "INFO. VCD" in 1 sector (user data of 2 k bytes), "ENTRIES. VCD" in 1 sector, "LOT. VCD" in 32 sectors, and "PBC. VCD" in 256 sectors at the maximum.

In the "INFO. VCD", information about disk, information about a segment play item which will be described later, and the like are recorded. In the "ENTRIES. VCD", the entry number for indicating the position from which the video or audio data recorded in the truck number TR="02" and thereafter is reproduced. Five hundreds of entries can be set at the maximum. In the "LOT. VCD", a table for indicating the address of the list corresponding to the reproduction sequence is recorded. In the "PBC. VCD", a list of reproduction sequence is recorded.

In the area with the truck number TR="02" and thereafter, as shown in FIG. 7A, a front margin area of 15 sectors is provided at the position in 150th sector (the index number "00") counted from the leading end of the truck, and a rear margin area in 15 sectors counted from the last end is provided. The area located between the front margin area and the rear margin area is defined as a compressed data area in which compressed video and audio data is recorded. In addition, in the compressed data area, as shown in FIG. 7B, the compressed video data and the compressed audio data are recorded in an interleaved manner so that the ratio between the sectors VS of the compressed video data and the sectors AS of the compressed audio data becomes about 6:1 on an average. The transmission rate of the video data is set to about 1.2M bit/second, and the transmission rate of the audio data is set to about 0.2 bit/second.

FIG. 7C shows the format of the sector VS of the compressed video data. The 2324 byte-data of 1 sector is recorded in the optical disk as data in the data area in the form 2 of the mode 2 shown in FIG. 4D. The sector VS of the compressed video data is constituted by a pack header section and a packet section, and the video data area provided to the packet section is used as an area for the compressed video data. The pack header includes a start code of the pack header, a system clock reference SCR, and the like. The packet header of the packet section includes a start code, an ID, a presentation time stamp PTS, a decoding time stamp DTS, and the like. The STD buffer is provided to only the leading packet.

FIG. 7D shows the format of the sector AS of the compressed audio data. As is the case of the compressed video data, the 2324 byte-data of 1 sector is recorded in the optical disk in the form 2 of the mode 2. Similar to the sector of the compressed video data, the sector of the compressed audio data is constituted by a pack header section and a packet section. The audio data area provided to the packet section is used as an area for the compressed audio data. The pack header section includes a start code for pack header, a system clock reference SCR, and the like. The packet header of the packet section includes a start code, an ID, a presentation time stamp PTS, a decoding time stamp DTS, and the like.

At the time of reproducing the compressed video data and the compressed audio data recorded in the optical disk, the images and the sounds are synchronized with each other using the system clock references SCR, the presentation time stamps PTS, the decoding time stamps DTS provided in the sector VS of the compressed video data and the sector AS of the compressed audio data respectively.

If there arises a trouble that the recorded signal cannot be read correctly due to the defects, scratches, or attachment of dusts on the disk during the reproduction of the compact disk structured as described above, the zone from which the signal cannot be read is subjected to a retry where the reading of the signal is tried again, thereby enabling the signal in a correct manner. In addition, the retry performs processing which corresponds to the data recorded in the compact disk. For example, when the recoded data is computer data, the retry performs processing which puts importance to obtaining correct data. When the recorded data is video or audio data, the retry performs processing which puts importance to keeping continuity of the operations, while allowing some lacks of data in order to prevent the images and sounds from being interrupted. Hereinafter, the retry for performing processing which puts importance to obtaining correct data is referred to as a normal retry, and the retry for performing processing which puts importance to keeping continuity of the operations is referred to as a simplified retry.

Figure 8:
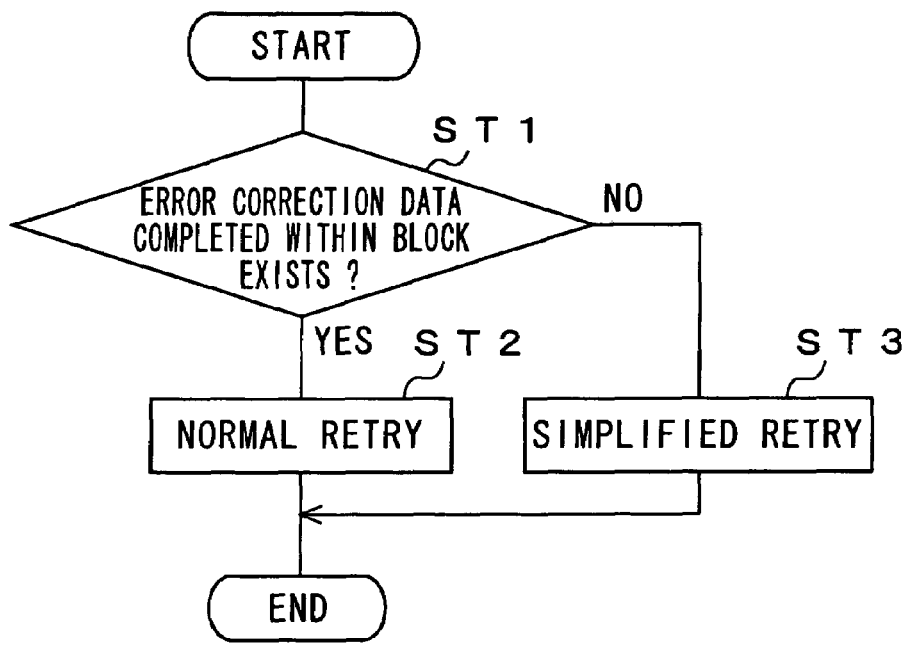
FIG. 8 is a flow chart showing retry.

FIG. 8 is a flow chart showing a retry. When the recorded signal cannot be read correctly, the retry is performed and then the procedure proceeds to Step ST1. In Step ST1 it is identified whether or not the data for performing the retry has an error correction code completed within the block.

In this case, when an auxiliary data area is prepared and a parity and the like is recorded therein, the data is identified as data having an error correction code completed within the block, and the procedure proceeds to Step ST2. Contrarily, when the data is identified as data having no error correction code completed within the block, the procedure proceeds to Step ST3.

In Step ST2, the data recorded in the compact disk is identified as data required to have high reliability such as computer data, because the recorded data has enhanced error correction ability. In this case, a normal retry is performed. In the normal retry, the number of times of retries N performed until the recorded data can be read correctly is set to a predetermined number of times NE or smaller. If it is impossible to correctly read the recorded data even after the reading is repeated in NE times, the occurrence of an error is announced and the retry is finished without transmitting the data which has not been identified as correct data. The repeating of the reading may be limited by a period of time, instead of the number of times. The reading may be repeated together with the processing for facilitating the reading of the recorded data, for example, the processing for lowering the rotation speed of the disk during the high-speed reproduction so that the data can be easily read.

In Step ST3, the data recorded is identified as data not required to have high reliability unlike computer data, and is data required to put importance to keep continuity of the operation, that is, to keeping the transition rate of the data, because the recorded data has no error correction code completed within the block. In this case, a simplified retry is performed.

In the simplified retry, the maximum number of times N of retries is set to a predetermined number of times NF which is smaller than the predetermined number of times NE. When the repeating of the reading is limited by a period of time, the time limit is set to be shorter than the time limit employed in the normal retry. Alternatively, the reading of the data may be repeated as far as the transition rate of the data is not excessively lowered to interrupt the images and sounds. If the recorded data cannot be read correctly, the retry is performed in the state where the data which has not been identified as correct data is also transmitted.

As described above, when the data has an error correction data completed within the block, a normal retry is performed. When the data has no error correction data completed within the block, a simplified retry is performed. In this manner, the data required to have high reliability such as computer data is subjected to retry in which priority is attached to reading the data correctly. If it is impossible to read the data correctly, the occurrence of an error is announced. As a result, only correct data can be output. In addition, the probability of reading the data in a correct manner can be increased by increasing the predetermined number of times NE. Contrarily, when the data is required to attach priority to keeping the transition rate such as video data and audio data, a retry in which priority is attached to keeping continuity is performed. As a result, the data can be reproduced without interrupting images and sounds.

Figure 9:
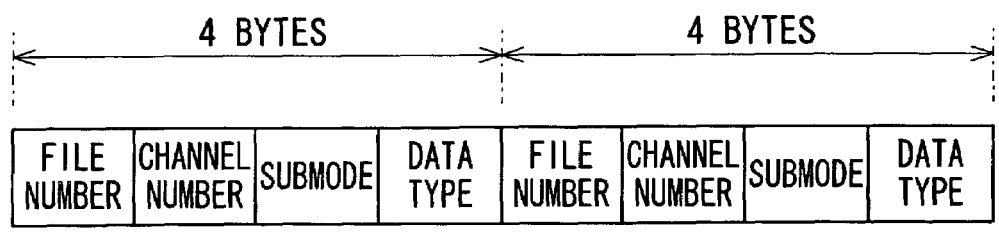
FIG. 9 is a diagram showing a structure of a subheader.

The aforementioned CD-ROM XA standards allow the coexistence of the computer data, and video and audio data. In the mode 2 shown in FIG. 4C and FIG. 4D, a subheader is provided. As is shown in FIG. 9, in the subheader, 4-byte header information including a file number, a channel number, submode information for allowing identification whether the form is form 1 or form 2, is recorded twice repeatedly. Next, description will be made on the case where an optimum retry suitable of the recorded data is performed by use of the subheader.

Figure 10:
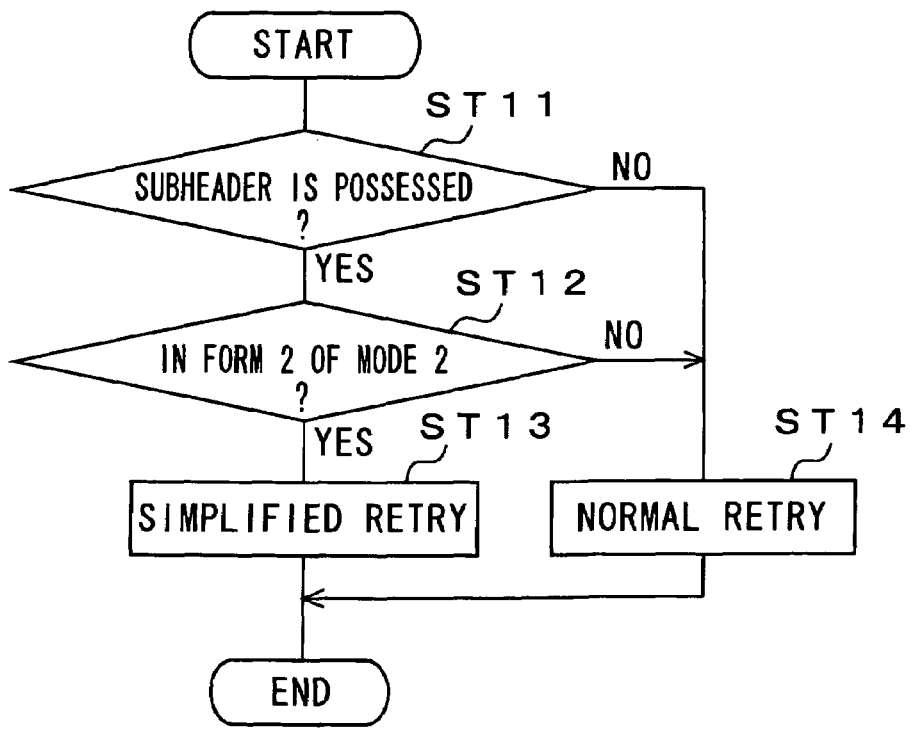
FIG. 10 is flow chart showing another retry.

FIG. 10 is a flow chart showing the retry performed by use of the subheader. When the recorded signal cannot be read correctly and the retry is performed, the procedure proceeds to Step ST11. In Step ST11, it is identified whether or not the sector of the data to be subjected to the retry has the subheader. If the sector of the data is identified as having the subheader, the procedure proceeds to Step ST12. Contrarily, if the sector of the data is identified as having no subheader, the procedure proceeds to Step ST14.

In Step ST12, it is identified whether or not the data is in the form 2, based on the submode information of the subheader. When the data is identified as being in the form 2, the procedure proceeds to Step ST13. Contrarily, when the data is identified as being not in the form 2, the procedure proceeds to Step ST14.

In Step ST13, since the data is recorded in the form 2 of the mode 2, and has no error correction code completed within the block, the recorded data is identified as data required to attach priority to maintaining the transition rate to keep continuity, rather than high reliability. In this case, the simplified retry is performed.

When the procedure proceeds from Step ST11 or Step 12 to Step ST14, in Step ST14, the recorded data is identified as data not required to attach priority to maintaining transition rate to keep continuity, that is, as data required to have high reliability. In this case, the normal retry is performed.

As in the manner described above, the use of the subheader also makes it possible to perform retry optimum for the recorded data.

In the flow chart shown in FIG. 8 and FIG. 10, when the retry is performed, it is identified whether or not the data has an error correction code completed within the block, or it is identified whether the retry should be set to the normal retry or the simplified retry, based on the subheader. In these cases, if the information about the sector to be subjected to the retry cannot be read correctly due to the defects on the disk and the like, there is a fear that erroneous identification is made. To avoid such a trouble, it may be identified whether the data has an error correction code completed within the block, by use of the information about the sector from which the data has been read correctly immediately before the retry is performed, or alternatively, it may be identified whether the retry should be set to the normal retry or the simplified retry, based on the subheader in the sector from which the data has been read correctly.

When the processing of the flow chart shown in FIG. 8 is performed in the case where it is identified that no subheader is present in Step ST11, it is possible to set the retry to either the normal retry or the simplified retry, depending on whether or not the data has an error correction code completed within the block even for the compact disk having no subheader.

In the aforementioned embodiment, when the recorded signal cannot be read correctly and the retry is performed during the reproduction of the data, the retry is set to either the normal retry or the simplified retry. In a compact disk reproducing apparatus capable of reproducing various kinds of compact disks, when a compact disk is mounted to the disk reproducing apparatus for example, the kind of the compact disk is identified among the compact disks including a CD-DA, CD-ROM, video CD, and the like is made, by use of the information recorded in the compact disk. Then, based on the result of identification of the disk, a signal processing operation suitable for the kind of the disk is performed to output a correct reproduction signal. In this structure, it may be determined whether the retry should be set to the normal retry or the simplified retry, based on the result of the disk identification.

Figure 11:
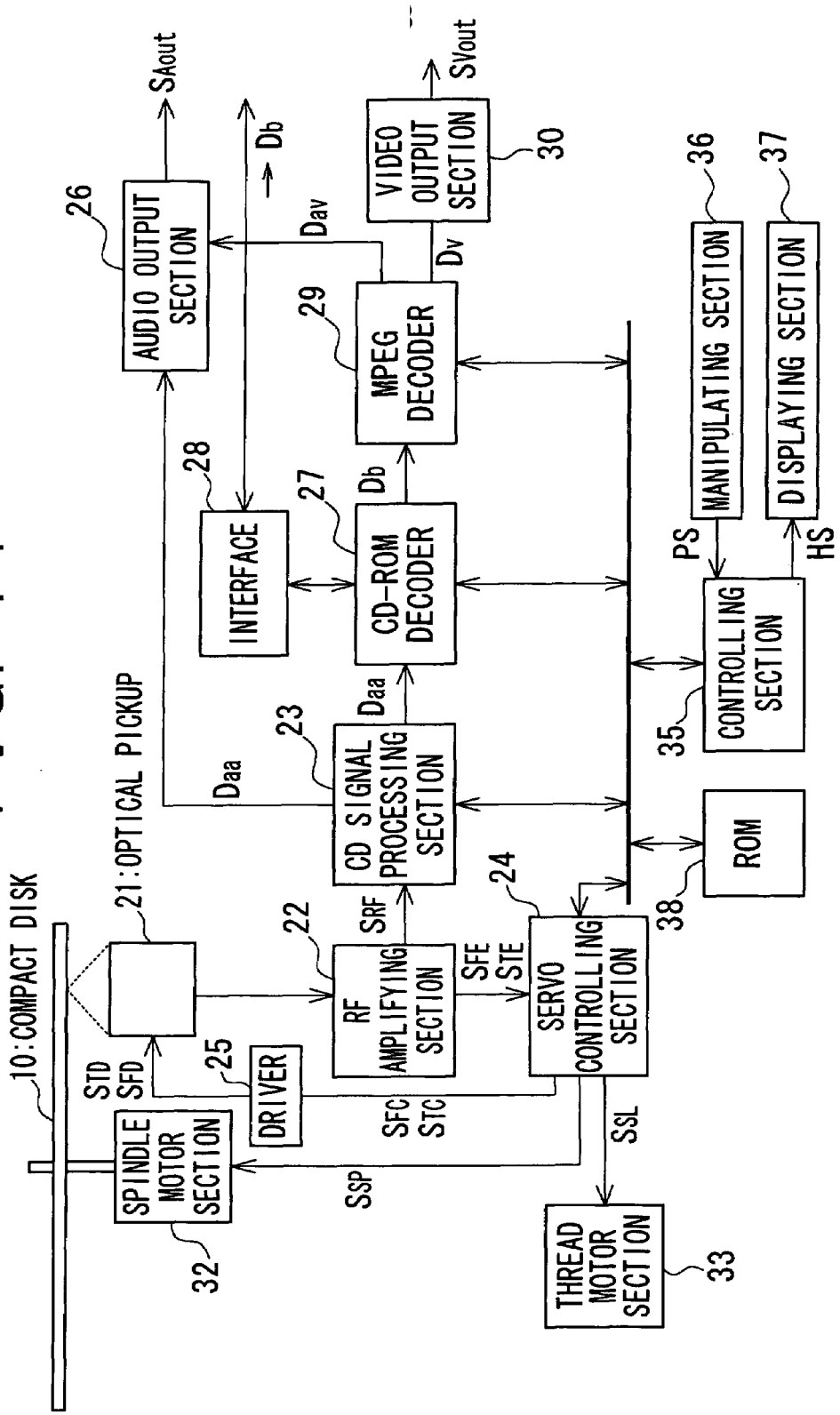
FIG. 11 is a diagram showing a structure of a disk reproducing apparatus.

FIG. 11 shows a structure of a disk reproducing apparatus capable of reproducing not only a CD-DA but also a CD-ROM and a video CD. A compact disk 10 is rotated at a predetermined speed by the spindle motor section 32. The spindle motor section 32 is driven in such a manner that the compact disk 10 is rotated at a predetermined rotation speed, based on a spindle control signal SP from a servo controlling section 24 which will be described later.

The compact disk 10 is irradiated with a light beam in a controlled light amount from an optical pickup 21. The light beam is reflected by the compact disk 10, and then is irradiated to a photodetecting section (not shown) in the optical pickup 21. The photodetecting section performs photoelectric conversion and current-voltage conversion, based on the reflected light beam to produce a voltage signal at a signal level corresponding to the light amount of the reflected light beam, and then supplies the resultant voltage signal to an RF amplifying section 22.

The RF amplifying section 22 produces a read signal SRF by use of the voltage signal from the optical pickup 21, and then supplies the resultant read signal SRF to a CD signal processing section 23. The RF amplifying section 22 also produces a tracking error signal STE and a focus error signal SFE, and supplies the resultant tracking error signals STE and the focus error signal SFE to a servo controlling section 24.

The servo controlling section 24 produces a focus control signal SFC for controlling an object lens (not shown) of the optical pickup 21 in such a manner that the laser beam is focused to a position in the recording layer of the compact disk 10, based on the focus error signal SFE supplied thereto, and supplies the focus control signal SFC to a driver 25. The servo controlling section 24 also produces a tracking control signal STC for controlling the object lens of the optical pickup 21 in such a manner that the light beam is irradiated to a center position of a desired track, based on the tracking error signal STE supplied thereto, and supplies the resultant tracking control signal STC to the driver 25. The servo controlling section 24 also produces a thread drive signal SSL, and supplies the resultant thread drive signal SSL to a thread motor section 33 so as to drive the thread motor section 33 to shift the optical pickup 21 toward a radial direction of the compact disk 10.

The driver 25 produces a focus drive signal SFD based on the focus control signal SFC, and also produces a tracking drive signal STD based on the tracking control signal STC. Thus-produced focus drive signal SFD and the tracking drive signal STD are supplied to an actuator (not shown) of the optical pickup 21, and as a result of this, the position of the object lens is controlled so that the optical beam focuses at a center position of a desired track.

The CD signal processing section 23 performs asymmetry correction and binarization for the read signal SRF supplied thereto, and converts the read signal SRF into a digital signal. The CD signal processing section 23 also performs EFM demodulation and CIRC reproduction to produce a reproduction signal Daa. The CD signal processing section 23 also supplies to a controlling section 35 the subcode information recorded in the compact disk 10 and the information recorded in a predetermined position in the compact disk.

When the controlling section 35, which will be described later, identifies the compact disk 10 as a CD-DA, the CD signal processing section 23 outputs and supplies a reproduction signal Daa to an audio output section 26. The audio output section 26 converts the digital reproduction signal Daa supplied from the CD signal processing section 23, and a reproduction signal Dav supplied from a MPEG decoder 29 which will be described later into analog audio signals Sa, and outputs the resultant analog audio signals Sa. When the controlling section 35 identifies the compact disk 10 as a CD-ROM or a video CD, the audio output section 26 supplies a reproduction signal Daa to a CD-ROM decoder 27.

The CD-Rom decoder 27 performs decoding by use of an error correction code completed within the block. When the controlling section 35 identifies the compact disk 10 as a CD-ROM, the CD-ROM decoder 27 performs decoding and supplies the signal obtained as a result of the decoding to an external device via an interface 28 as a reproduction signal Db. When the controlling section 35 identifies the compact disk 10 as a video CD, the CD-ROM decoder 27 supplies the reproduction signal Db to an MPEG decoder 29.

The MPEG decoder 29 separates the signals of the video sectors VS and the signals of the audio sectors AS from each other, and then, decodes the compressed video data to produce a reproduction signal Dv. The MPEG decoder 29 also decodes the compressed audio data to produce a reproduction signal Dav. Furthermore, the MPEG decoder 29 synchronizes the video reproduction signal Dv and the audio reproduction signal Dav with each other and outputs them, by use of the system clock reference SCR, the presentation time stamp PTS, the decoding time stamp DTS which are recorded in the video CD. The video reproduction signal Dv is supplied to a visual output section 30, and simultaneously, the audio reproduction signal Dav is supplied to the audio output section 26. The video output section 30 converts the reproduction signal Dv into a video output signal Svout in an NTSC mode and the like, and outputs the resultant signal.

To the controlling section 35, a manipulating section 36 and a displaying section 37 are connected. When the manipulating section 36 is operated to supply a manipulation signal PS to the controlling section 35, the controlling section 35 controls each of the sections based on the operation control program stored in a ROM 38 to operate the sections in accordance with the manipulation by the manipulating section 36. The controlling section 35 also controls each of the sections based on the command supplied from an external device via an interface 28, for example, a computer device.

The controlling section 35 also performs identification of the compact disk, based on the subcode supplied from the CD signal processing section 23 and the information read from a predetermined position. Based on the result of the identification, the controlling section 35 performs reproduction and outputs signals in accordance with the kind of the compact disk. The controlling section 35 also produces a display signal HS and supplies it to the displaying section 37 to operate the displaying section 37 to display the operating state of the disk reproducing apparatus, the information read from the compact disk, and the like.

Hereinafter, the operation of setting the retry in the disk reproducing apparatus will be described, with reference to the flow chart of FIG. 12. When the compact disk 10 is mounted to the disk reproducing apparatus, in Step ST21, TOC information recorded in the lead-in zone is read. Then, the procedure proceeds to Step ST22.

In Step ST22, the controlling section 35 identifies whether the compact disk 10 is a disk in which data is recorded, based on the data in the control field of the subcode Q which has been read together with the TOC information. When the data in the control field is (01×0), and the compact disk 10 is identified as a disk in which data is recorded, the procedure proceeds to Step ST23. Contrarily, when the compact disk 10 is not identified as a disk in which data is recorded, for example, when the data in the control field is (0000) as is the case of a CD-DA, the procedure proceeds to Step ST26.

Figure 13:
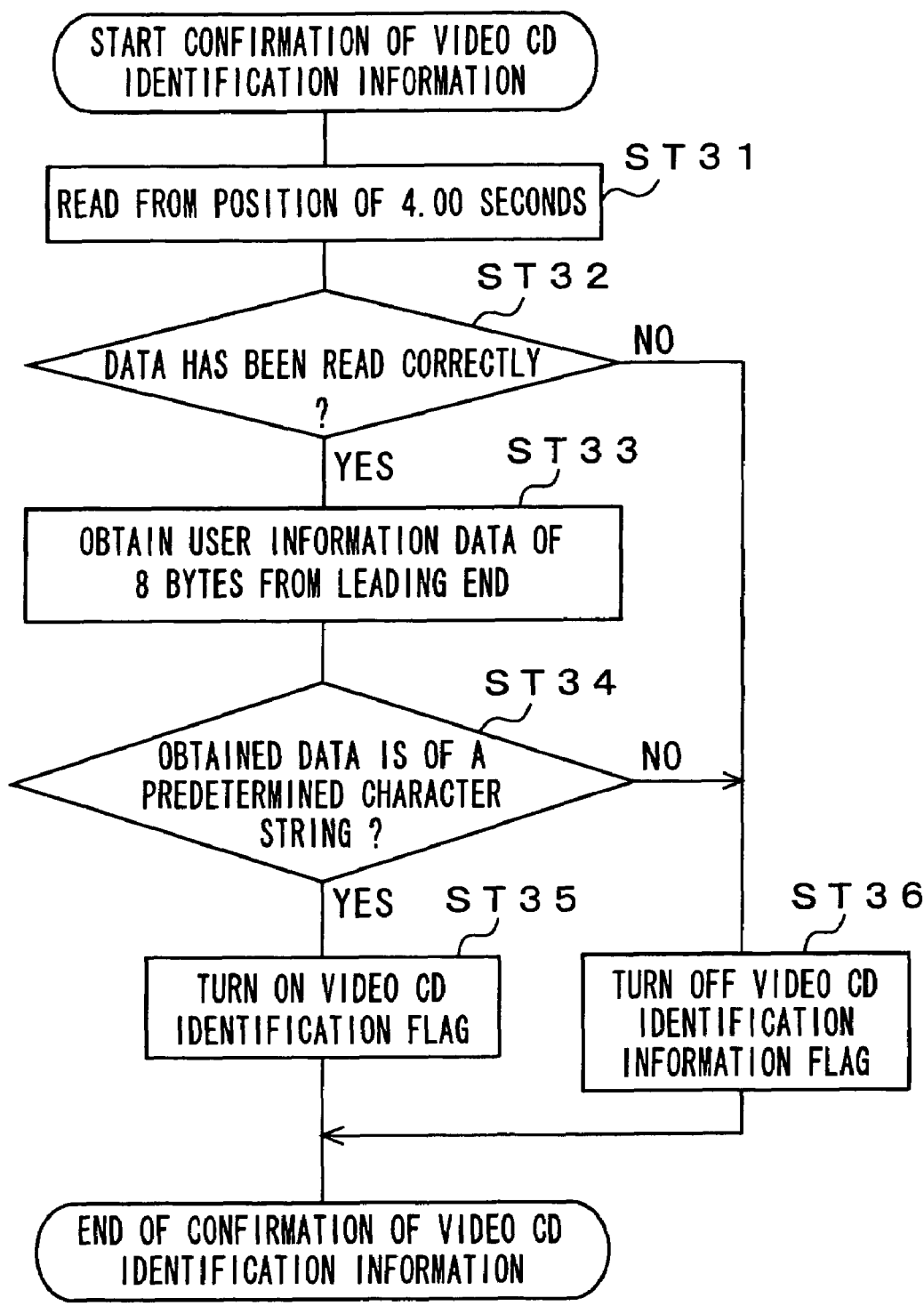
FIG. 13 is a flow chart showing the processing of confirming video CD identification information.

In Step ST23, it is identified whether or not the video CD identification information is recorded in the area with the track number of TR="01". FIG. 13 is a flow chart showing a processing for confirming the video CD identification information.

In Step ST31, as shown in FIG. 6, data is read from the position of 4.00 seconds (the logical block address LBA=96h (where h represents hexadecimal notation)) which is a starting position of the video CD information section. Then, the procedure proceeds to Step ST32. In Step ST32, it is identified whether the data has been read correctly. When the data is read correctly, the procedure proceeds to Step ST33. Contrarily, when the data is not read correctly, the procedure proceeds to Step ST36.

Figure 15:
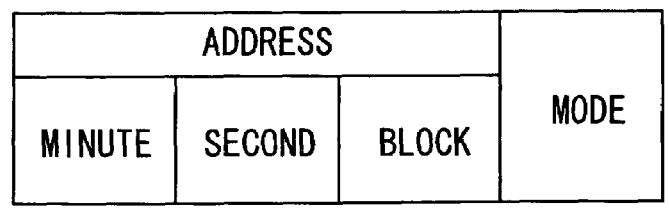
FIG. 15 is a diagram showing a structure of a header.

In Step ST33, among the data read from the sector at the position of 4.00 seconds, user information data of only 8 bytes counted from the leading end is obtained. FIG. 14 shows exemplary data read from the sector at the position of 4.00 seconds, in the state of eliminating the synchronous signal therefrom. The first 4 bytes of the data constitute a header. The constitution of the header is as shown in FIG. 15, that is, the first three bytes indicate a "minute, second, frame", and the next one byte indicates a mode segment. As has been described above, since the video CD information section is started from the position of 4.00 seconds, the first 3 bytes of the header is defined as "00,04,00". The next 1 byte indicates a mode segment. Since the mode segment has the data of "02", it is known that the data structure is in the mode 2. When the data structure is in the mode 2, as shown in the aforementioned FIGS. 4C and 4D, a subheader is provided subsequent to the header. Therefore, the 8 bytes subsequent to the mode indication data indicate the subheader. As shown in FIG. 9, in the subheader, 4-byte header information is recorded twice repeatedly. In the case shown in FIG. 14A, the header information "00, 00, 89, 00" are repeated twice in the subheader. In the case shown in FIG. 14B, the header information "00, 01, 88, 00" is repeated twice in the subheader.

The data subsequent to the subheader is user information for the video CD information section. The position corresponding to 13th byte counted from the leading end is a starting position of the user information for the video CD information section. Specifically, in Step ST33, the acquisition of the data is started from the position corresponding to the 13th byte counted from the leading end except for the synchronous signal, and the acquisition of the data is finished at the position corresponding to the 20th byte counted from the leading end. In this manner, data of only 8 bytes from the leading end of the video CD information section can be obtained.

In the case of a video CD, as shown in FIG. 14, 8 bytes from the leading end of the user information of the video CD information section are defined as data "56, 49, 44, 45, 4F, 5F, 43, 44" for indicating a predetermined character string "VIDEO_CD" as video CD identification information. Therefore, in Step ST34, it is identified whether or not the data obtained in Step ST33 is data of a predetermined character string, that is, data "56, 49, 44, 45, F, 5F, 43, 44" for indicating "VIDEO_CD". In this manner, the presence or absence of video CD identification information can be identified. In Step ST34, when the data "56, 49, 44, 45, 4F, 5F, 43, 44" coincides with the data obtained in Step ST33, it is assumed that the video CD identification information is detected, and the procedure proceeds to Step ST35. When these data do not coincide with each other, it is assumed that no video CD identification information is detected, and the procedure proceeds to Step ST36.

In Step ST35, since the video CD identification information has been detected, the video CD identifying flag set to the register within the controlling section 35 is turned on, and the processing for confirming the video CD identification information is finished. When the procedure proceeds from Step ST32 or Step ST34 to Step ST36, since no video CD identification information has been detected, the video CD identifying flag is turned off, and the processing for confirming the video CD identification information is finished.

Figure 12:
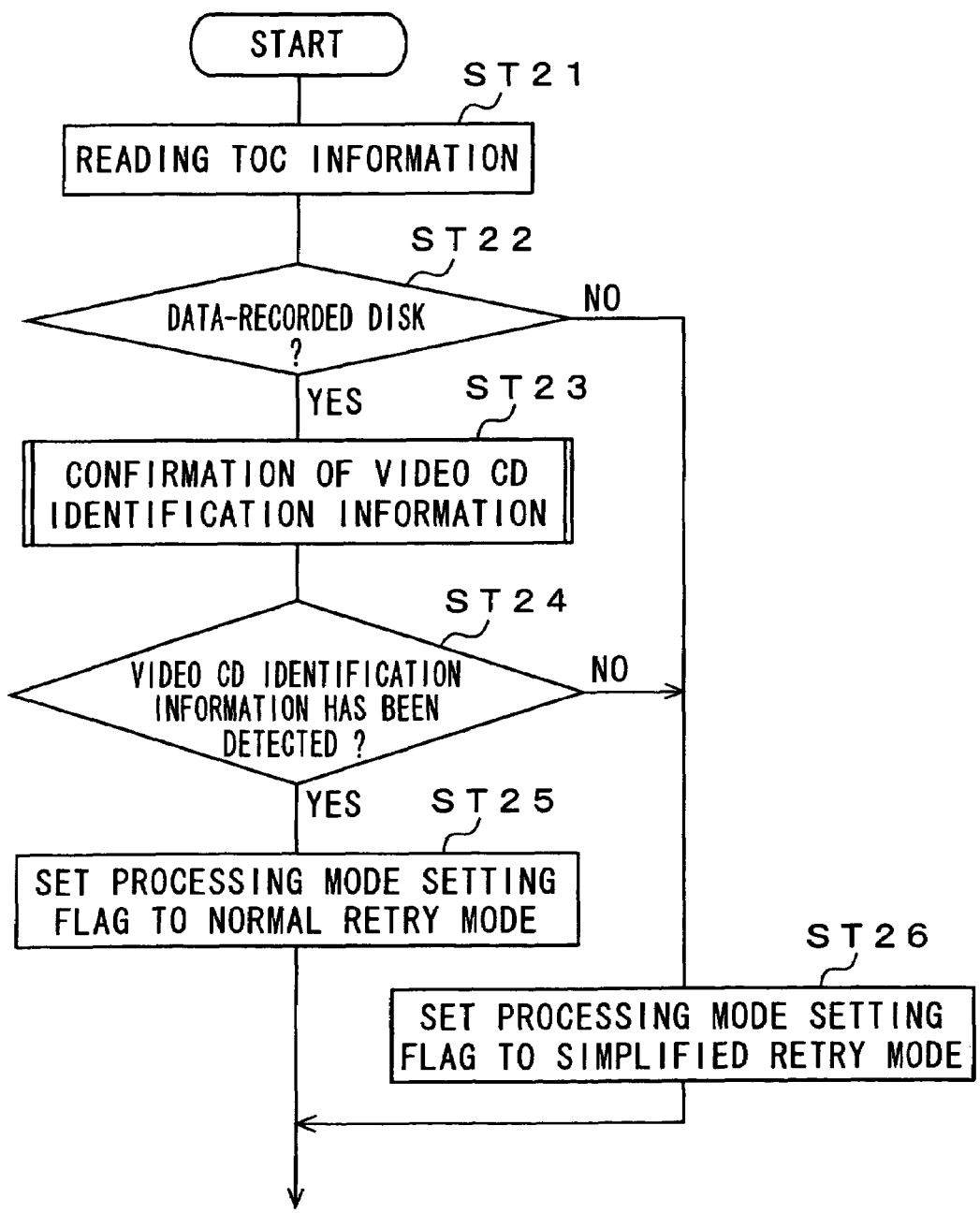
FIG. 12 is a flow chart showing an operation of setting retry.

In Step ST23 in FIG. 12, it is identified whether or not the video CD identification information has been detected. At this time, when the video CD identifying flag is turned off by the processing shown in FIG. 13 and it is indicated that no video CD identification information has been detected, the procedure proceeds to Step ST25. When the video CD identifying flag is turned on and it is indicated that the video CD identification information has been detected, the procedure proceeds to Step ST26.

In Step ST25, a processing mode setting flag, provided within the controlling section 35, that is, a flag for setting the retry performed at the time when the data cannot be read correctly to the normal retry or the simplified retry, is set to the normal retry mode. When the procedure proceeds from Step ST22 or Step ST24 to Step ST26, the processing mode setting flag is set to the simplified retry mode in Step ST26.

After that, the compact disk 10 is reproduced in the disk reproducing apparatus. If there arises the case where the recorded data cannot be read correctly, the normal retry or the simplified retry is performed based on the processing mode setting flag.

As in the manner described above, identification of the compact disk is performed automatically at the time when the disk is mounted to the apparatus. Based on the results of the identification, the retry is set to the normal retry or the simplified retry. Due to this arrangement, it is possible to set the retry which attaches priority to reading data correctly when the data is required to have high reliability such as computer data. On the other hand, it is also possible to set the retry which attaches priority to keeping continuity of the data when the data is required to maintain its transition rate such as visual or audio data. As a result, it is possible to perform retry optimized for the recorded data.

For the data required to maintain its transition rate such as visual or audio data, a retry which attaches priority to keeping continuity is performed. In this case, the reproduction is continuously performed even if the data is not correct. As a result, a video or audio output signal can be obtained even if an optical disk with poor quality is reproduced.

The detection of the predetermined character string "VIDEO_CD" as the video CD identification information is automatically performed in the disk reproducing apparatus as described above. Alternatively, the detection may be performed at the time when an external device such as a host computer or a reproducing application makes a read request to the disk reproducing apparatus for the purpose of disk identification. In addition, since the predetermined character string "VIDEO_CD" as the video CD identification information is recorded at a predetermined position, the detection thereof is easy.

In the aforementioned embodiment, the mode of retry is selected based on the results of the compact disk identification. The results of compact disk identification may be also utilized in other operations.

It is assumed that the control on rotation of the spindle motor is switched, based on the results of the compact disk identification. For example, when the compact disk is identified as a video CD, the operation is image reproduction which has no need of reading the data at high speed. In this case, the disk is rotated at a normal speed, thereby preventing the electric power consumption from increasing and decreasing the sounds created by the operations of the disk apparatus. When the compact disk is identified as a CD-ROM, the data is read in the state where the disk is rotated at a speed higher than a normal speed, thereby increasing the data transition rate. As a result, the data can be efficiently read from the CD-ROM when the data is processed in the computer apparatus.

It is possible to switch the amount of data which is read beforehand based on the results of disk identification. As to a video CD, there are many cases where the data recorded for use in reproducing images and the like is sequentially read. Therefore, when the disk is identified as a video CD, the amount of data which is read beforehand is increased. In this manner, the read data can be efficiently processed, and in addition, the interruption of the images for example can be prevented. On the other hand, as to the CD-ROM, there are many cases where the data is read at random. In such cases, reading of the data beforehand may not be effective. There are also some cases where various control parameters are required in order to shorten the access time. For these reasons, the amount of data which is read beforehand is reduced. As a result, the data can be read efficiently, without reading unnecessary data.

In the aforementioned embodiment, description has been made as to the case where he optical disk is a compact disk. Similarly, when the optical disk is a DVD which has a high recording capacity by increasing the recording density to be higher than that of a compact disk, the reproduction can be performed in accordance with the data recorded in the disk.

Figure 16:
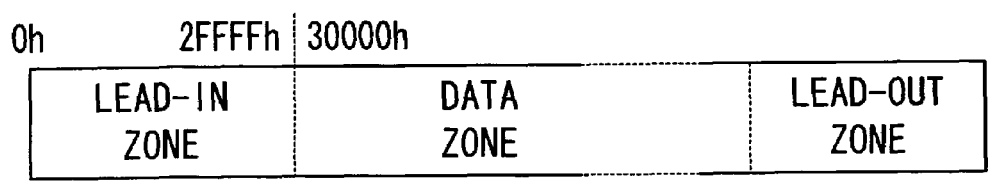
FIG. 16 is a diagram showing a physical sector number of a DVD disk.

FIG. 16 shows a physical sector number in a DVD. The zone from the physical sector number "Oh" at the innermost peripheral side of the disk to "2FFFFh" is defined as a lead-in zone for indicating a physical specification of the disk and information about the supplier of contents. The zone from the physical sector number "30000h" subsequent to the lead-in zone to the zone at the outermost peripheral side is defined as a data zone. Data signals of contents are recorded in the data zone. At the outer peripheral side of the data zone, a lead-out zone, for indicating the termination of the data zone is provided. The irradiating position of the light beam is made to be movable within the range from the lead-in zone to the lead-out zone.

As the file system employed in the DVD-ROM standards, employed are the International Organization for Standardization (ISO) 9660 which is used as the standards for CD-ROM, and the universal disk format (UDF) which is usable in combination with the standards for a physical layer not only dedicated to reproduction but also capable of writing and rewriting. In order to satisfy both the standards, a file structure referred to as "UDF Bridge" is employed.

FIG. 17 shows the file structure of "UDF Bridge". In this structure, logical sector numbers (LSNs) from "0" to "15", from "21" to "31", and from "66" to "255" are defined as reserved areas. LSNs from "16" to "20" are defined as "UDF Bridge Volume Recognition Sequence (VSR)" areas. An LSN of "16" is defined as a "Primary Volume Descriptor". An LSN of "17" is defined as a "Volume Descriptor Set Terminator". An LSN of "18" is defined as a "Beginning Extended Area Descriptor". An LSN of "19" is defined as an "NSR descriptor". An LSN of "20" is defined as a "Terminating Extended Area Descriptor". The "Primary Volume Descriptor" defined by the LSN of "16" is a volume descriptor of a CD-ROM standardized by the ISO 9660. The "Volume Descriptor Set Terminator" defined by the LSN of "17" indicates the termination of the "Primary Volume Descriptor". The "Beginning Extended Area Descriptor" defined by the LSN of "18" is a descriptor for indicating the beginning of an extended area. The "NSR Descriptor" defined by the LSN of "19" is a standard descriptor, and a descriptor indicated in the International Electrotechnical Commission (ISO/IEC) 1344 is employed. The "Terminating Extended Area Descriptor" defined by the LSN of "20" is a descriptor for indicating the termination of the extended area.

LSNs from "32" to "47" are defined as main VDS areas. An LSN of "32" is defined as a "Primary Volume Descriptor". An LSN of "33" is defined as an "Implementation Use Volume Descriptor". An LSN of "34" is defined as a "Partition Descriptor". An LSN of "35" is defined as a "Logical Volume Descriptor". An LSN of "36" is defined as an "Unallocated Space Descriptor". An LSN of "37" is defined as a "Terminating Descriptor". The "Primary Volume Descriptor" defined by the LSN of "32" is a volume descriptor defined in the Universal Disk Format (UDF). The "Implementation Use Volume Descriptor" defined by the LSN of "33" is a volume descriptor for a logical system. The "Partition Descriptor" defined by the LSN of "34" is a partition descriptor. The "Logical Volume Descriptor" defined by the LSN of "35" is a logical volume descriptor. The "Unallocated space Descriptor" defined by the LSN of "36" is an allocated space descriptor. The "Terminating Descriptor" defined by the LSN of "37" indicates the termination of the descriptor. Subsequent to this, LSNs from "38" to "47" are defined as "Trailing Logical Sectors".

LSNs from "48" to "63" are defined as reserved VDS areas. The reserved VDS areas are made to be identical to main VDS area, and are used as backups when information cannot be read from the main VDS areas.

The "Logical Volume Integrity Descriptor" defined by the LSN of "64" is an integrity descriptor for controlling various kinds of fault information generated in the logical volume. The "Terminating Descriptor" defined by the LSN of "65" indicates the termination of the descriptors.

The "Anchor Volume Descriptor Pointer" defined by the LSN of "256" is an anchor point for indicating the position of the main VDS area. The LSN of "257" and thereafter indicate the ISO 9660 file structure such as a "Path Table" for indicating the path for reaching the aimed file, a "Root Directory", and the like. Subsequent to these areas, information standardized by the UDF, for example, the UDF file structure including a "File Set Descriptor" and a "File Entry" is indicated. The area subsequent to this area is defined as an UDF/ISO file storing area in which computer data, video data, and the like are recorded. The last LSN is defined as a second anchor point. The second anchor point is made to be identical to the anchor point defined by the LSN of "256", and is used as a backup when the anchor point defined by the LSN of "256" cannot be read.

An UDF logical volume space is allocated starting from the position with the logical sector number p for indicating the UDF file structure. A logical block number q is allocated starting from the position with the logical sector number p.

Figure 18:
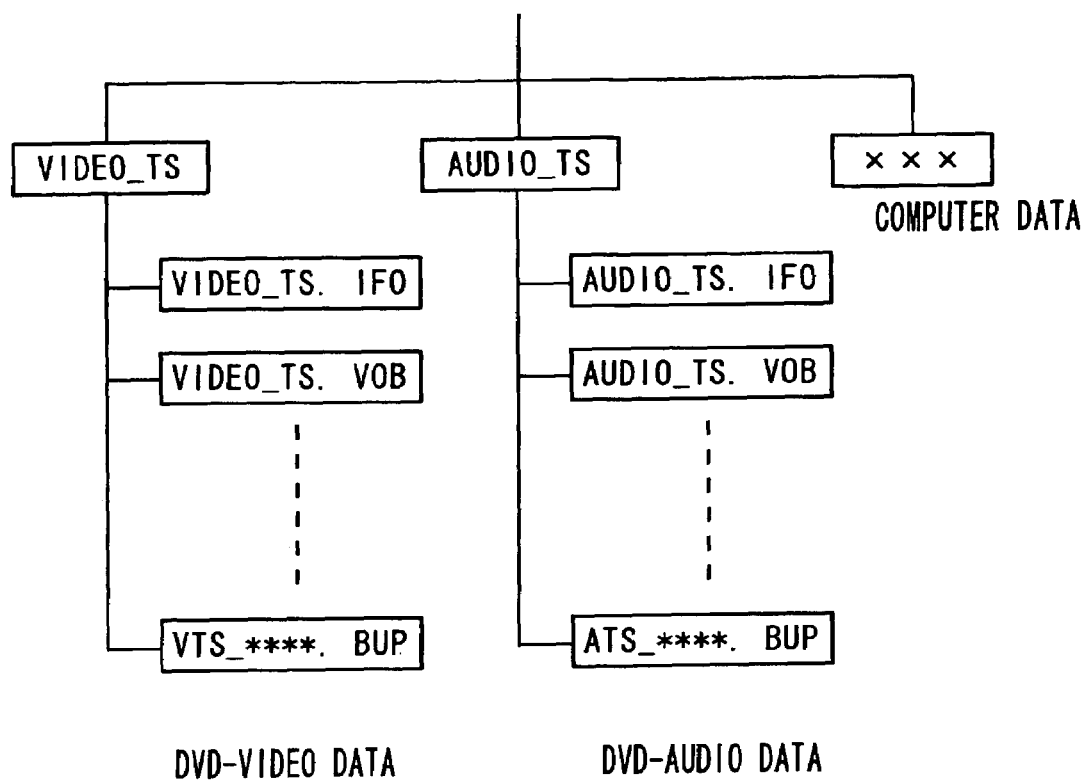
FIG. 18 is a diagram showing a data structure of UDF Bridge.

FIG. 18 shows a directory structure. Video data is stored into the "VIDEO_TS" directory. Audio data is stored into the "AUDIO_TS" directory. Computer data is stored into the computer data directory. The directory with an extension of "IFO" is a directory related to reproduction and control information. The extension of "V0D" is an extension related to video data. The extension of "A0D" is an extension related to audio data. The extension of "BUP" is used as a backup.

Figure 19:
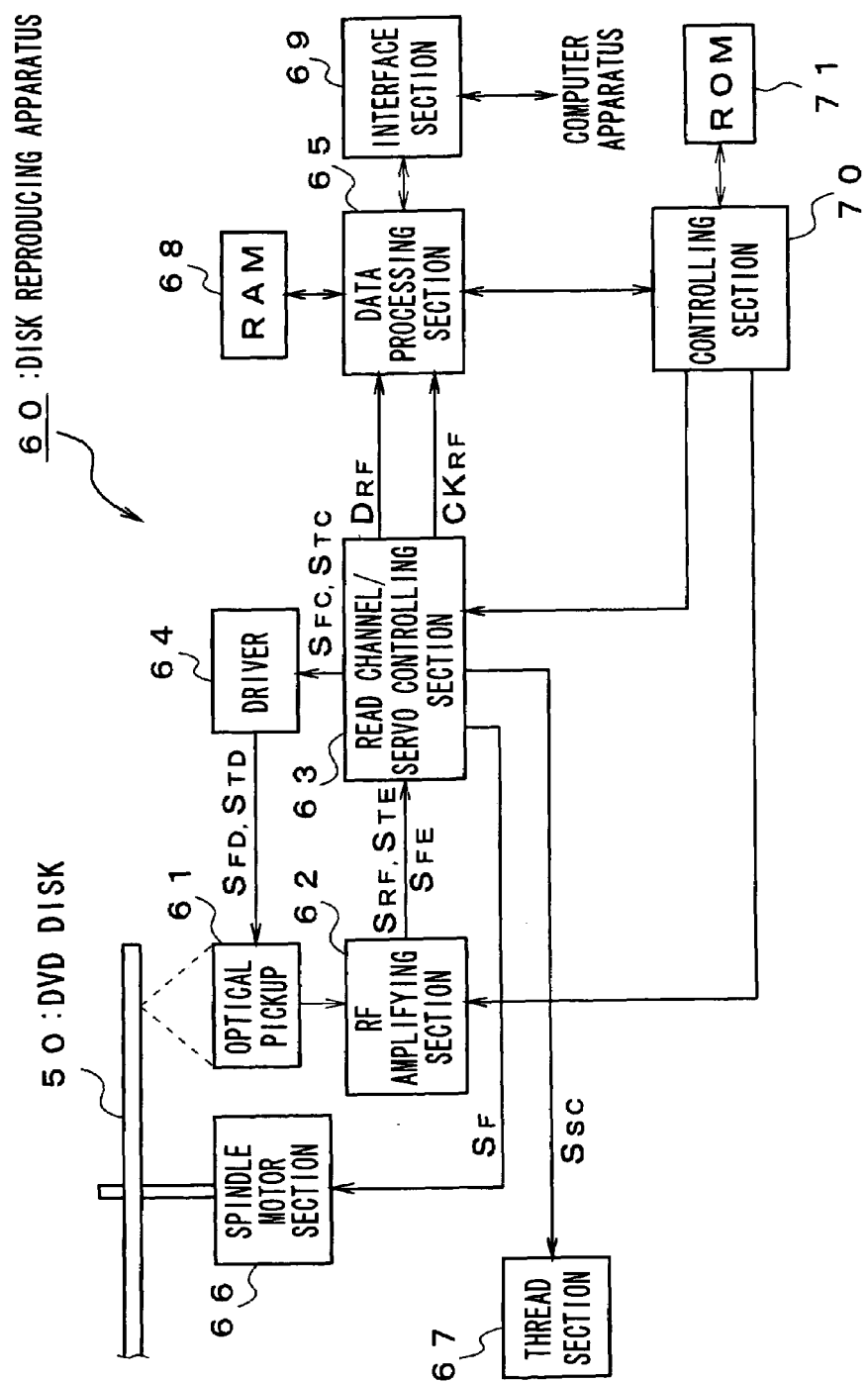
FIG. 19 is a diagram showing a structure of a disk reproducing apparatus.

FIG. 19 shows a structure of a disk reproducing apparatus 60 for reproducing a DVD 50. The DVD 50 is rotated at a predetermined speed by a spindle motor section 66. The spindle motor section 66 is driven in such a manner as to control the DVD 50 to rotate at a predetermined speed, based on a frame synchronous signal SF from a read-channel/servo controlling section 63 which will be described later.

The DVD 50 is irradiated with a light beam in a controlled light amount from an optical pickup 61 of the disk reproducing apparatus 60. The light beam reflected by the DVD 50 is irradiated to a photodetecting section (not shown) of the optical pickup 61. Based on the reflected light beam, the photodetecting section performs photoelectric conversion and current-voltage conversion to produce a voltage signal at a signal level corresponding to the light amount of the reflected light beam, and supplies the resultant voltage signal to an RF amplifying section 62.

The RF amplifying section 62 produces a read signal SRF, a tracking error signal STE and a focus error signal SFE using the voltage signal from the optical pickup, and supplies the resultant signals to the read-channel/servo controlling section 63.

The read-channel/servo controlling section 63 produces a focus control signal SFC for controlling an object lens (not shown) of the optical pickup 61 in such a manner that the laser beam focuses on the position in the recording layer of the DVD 50, based on the focus error signal SFE supplied thereto, and supplies the resultant focus control signal SFC to the driver 64. The read-channel/servo controlling section 63 also produces a tracking control signal STC for controlling the object lens of the optical pickup 61 in such a manner that the light beam is irradiated to the center position of the desired track, based on the tracking error signal STE supplied thereto, and supplies the resultant tracking control signal STC to a driver 64.

The driver 64 produces a focus drive signal SFD, based on the focus control signal SFC, and also produces a tracking drive signal STD, based on the tracking control signal STC. Thus-produced focus drive signal SFD and tracking drive signal STD to an actuator (not shown) of the optical pickup 61, and as a result of this, the position of the object lens is controlled in such a manner that the light beam focuses at the center position of the desired track.

The read-channel/servo controlling section 63 performs asymmetry correction and binarization for the read signal SRF supplied thereto, and converts the read signal SRF into a digital signal to produce a data signal DRF, and then supplies the resultant data signal DRF to a data processing section 65. The read-channel/servo controlling section 63 also performs production of a clock signal CKRF synchronous with the digital data obtained as a result of conversion, and detection of a frame synchronous signal, and then, supplies thus-produced clock signal CKRF to the data processing section 65, and supplies the frame synchronous signal SF to the spindle motor section 66.

The read-channel/servo controlling section 63 also produces a thread control signal SSC for controlling the optical pickup 61 to shift toward a radial direction of the DVD 50 in order to prevent the laser beam from being irradiated beyond the tracking control range, and supplies the resultant thread control signal SSC to a thread section 67. The thread section 67 drives a thread motor so as to control the optical pickup 61 to shift toward a radial direction of the DVD 50.

The data processing section 65 performs 8/16 demodulation for the data signal DRF, and also performs error correction by a reed-solomon code using a part of the memory area of a RAM (Random Access Memory) 68 as a work area. The data signal after error correction is stored into a cash area which is a part of the memory area of the RAM 68, and then, is supplied as a reproduction data signal RD to the computer apparatus and the like via an interface section 69 in compliance with the AT Attachment Packet Interface (ATAPI) standards for example. The data processing section 65 reads positional information for indicating the position on the optical disk from the data signal DRF, and supplies the positional information to a controlling section 70. In the case where the data processing section 65 reads fault positional information recorded in the DVD 50, the fault positional information is supplied to the controlling section 70.

To the controlling section 70, a ROM 71 is connected. The controlling section 70 processes a command from the computer apparatus based on the program for operation control stored in the ROM 71, and controls operations of each of the sections in the disk reproducing apparatus 60. For example, when there is an access request from the computer apparatus by the ATAPI command by use of the logical address, the controlling section 70 converts the logical address into a physical address, referring to the fault positional information about the optical disk supplied from the data processing section 65. In this case, the controlling section 70 simultaneously drives the optical pickup 61 in such a manner that access to the position of the physical address obtained as a result of conversion is made, by use of the information for indicating the position on the optical disk supplied form the data processing section 65.

Next, a data reproducing operation in the disk reproducing apparatus 60 will be described with reference to FIG. 20. When a command for requesting data written in the DVD 50 is supplied from the computer apparatus, the controlling section 70 in the disk reproducing apparatus 60 identifies whether or not the supplied command is effective in Step ST41. When the command is wrong or is identified as a command which cannot be processed and therefore as an ineffective command, the procedure proceeds to Step ST42 where the ineffectivenss of the command is announced to the computer apparatus. Then, the processing is terminated. When the command is effective, the procedure proceeds to Step ST43.

In Step ST43, it identified whether or not the data requested in response to the command is stored in the RAM 68. When it is identified that the data is stored, the procedure proceeds to Step ST44 where the requested data is transmitted from the RAM 68 to the computer apparatus. Then, the processing is terminated. When it is not identified that the data is stored, the procedure proceeds to Step ST45.

In Step ST45, the number of times N of retries is set to "0", Then, the procedure proceeds to Step ST46 where an interruption is performed. In the interruption in Step ST46, the data is read in units of 16 sectors, and the required data is read from the disk via the optical pickup 61 and the RF amplifying section 62. At the same time, the data processing section 65 performs an error correction for the data signal DRF supplied from the read channel/servo controlling section 63. By use of the error detection code (EDC) which is added to each of the sectors, it is identified whether or not the error correction has been performed correctly. Then, the interruption is terminated. The number of times N of retries indicates how many times the procedure in Step ST46 has been repeated because the correct data cannot be read.

In Step ST47, the physical sector number for example in the first sector is stored in the register in the controlling section 70 as ID information. At the same time the results of identification which has been performed by use of the EDC is stored in the register as well. Then, the procedure proceeds to Step ST48. In Step ST48, it is identified whether or not a detection flag for indication that the disk has been identified as a DVD-video disk is set. If the detection flag is not set because the identification whether or not the disk is a DVD-video disk is still not performed, or if the detection flag is not set because the disk has not been identified as a DVD-video disk as a result of the identification, the procedure proceeds to Step ST49 where the disk identification for identifying whether or not the disk is a DVD-video disk is performed. When the identification result flag is set because the disk has been identified as a DVD-video disk, the procedure proceeds to Step ST 50.

Figure 21:
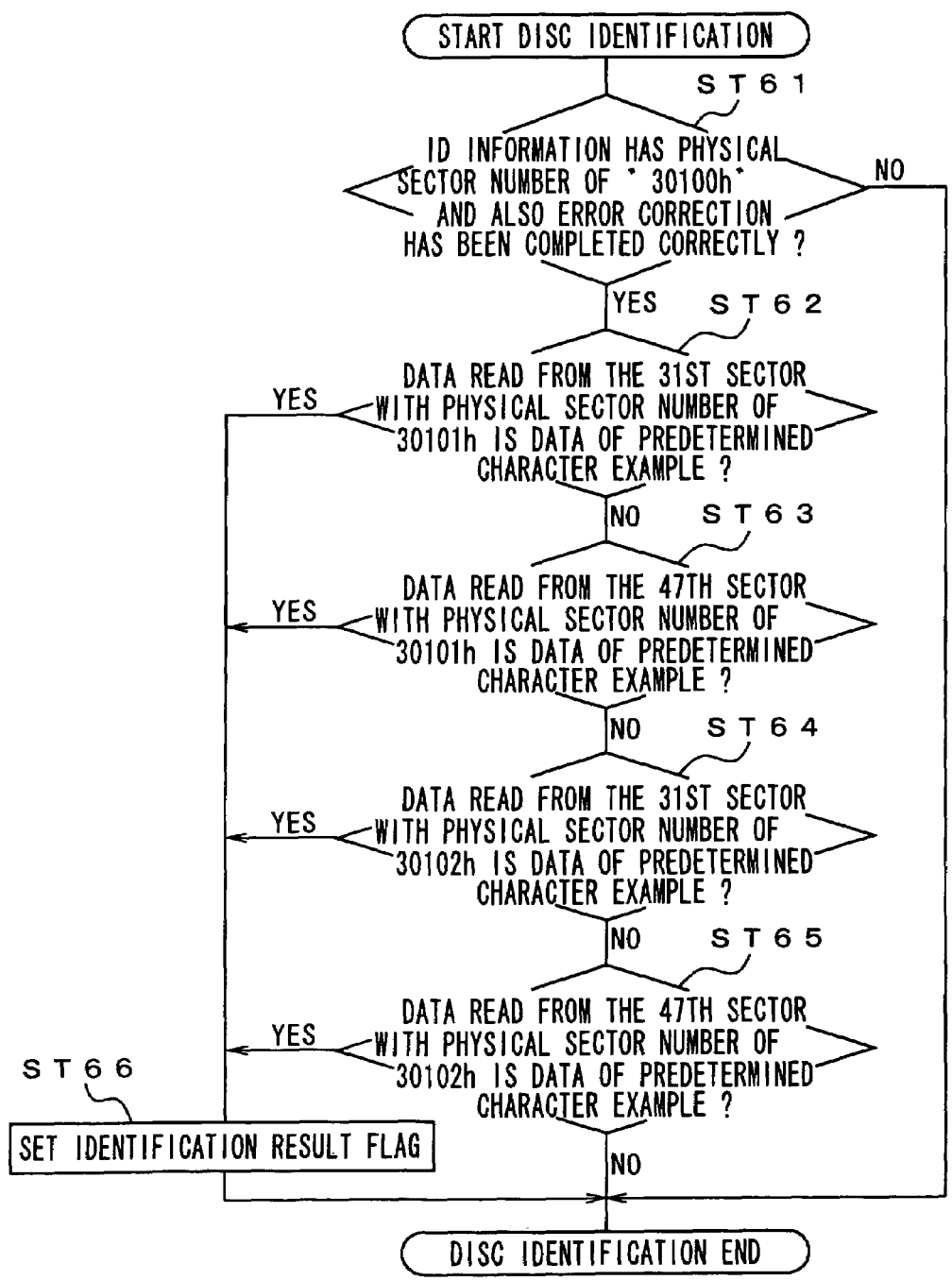
FIG. 21 is a flow chart showing data identification.

FIG. 21 is a flow chart showing a disk identification in Step ST49. In Step ST61, it is identified whether or not the stored ID information has the physical sector number of "30100h" which indicates the LSN of "256", and also whether or not the error correction has been completed correctly, based on the result of the identification using the EDC. When the ID information indicates the physical sector number of "30100h", that is, data of 16 sectors is read in the state where the information of "Path Table" is included, and also the error correction has been completed correctly, the procedure proceeds to Step ST 62. When the ID information does not indicate the physical sector number of "30100h", or the error correction has not been completed correctly, the identification is terminated.

In Step ST62, the data for indicating the directory information is read from the data of the sector including the "Path Table" of the data stored in the RAM 68. Then, it is identified whether or not the character for indicating the directory of video data has been detected.

FIG. 22 is a dump list indicating a part of data of 16 sectors which has been read from the position with the LSN of "256" and has been stored into the RAM 68. In Step ST62, the data is read from the 31st sector data (at the address "1Eh" assuming that the address of the first data is "0h") with the LSN of "257" (with the physical sector number of "30101h") which includes the "Type L Path Table". Then, it is identified whether or not a predetermined character string, for example, a character string "VIDEO_TS" (with data of 56 49 44 45 4F 5F 54 53) which makes it possible to identify the video data as being recorded has been detected. When the character string has been detected, the procedure proceeds to Step ST 66. When the character has not been detected, the procedure proceeds to Step ST63.

In Step ST63, the data is read from the 47th sector (at the address "2Eh" assuming that the address of the first data is "0h") which also has been used in Step ST 62. Then, it is identified whether or not a predetermined character string has been detected. When the character string has been detected, the procedure proceeds to Step ST66. When the character string has not been detected, the procedure proceeds to Step ST64.

As described above, in the steps ST 62, 63 detection of the character string is performed at different positions in an identical sector. In this manner, even when no audio data is recorded and therefore the position of the character string of "VIDEO_TS" is set to "AUDIO_TS" shown in FIG. 22, the character string can be reliably detected. Next, in Step ST64, data is read from a predetermined position in the sector which includes the "Path Table" of the data stored in the RAM 68 and is different from the sectors used in Steps ST62, ST63. Then, it is identified whether or not a predetermined character string has been detected. For example, the data is read from the 31st sector data with the LSN of "258" (with the physical sector number of "30102h") which includes the "Type M Path Table". Then, it is identified whether or not a predetermined character string has been detected. When the character string has been detected, the procedure proceeds to Step ST66. When the character string has not been detected, the procedure proceeds to Step ST65.

In Step ST65, the data is read from the 47th sector which also has been used in Step ST64. Then, it is identified whether or not a predetermined character string has been detected. As described above, detection of the character string is performed for different sectors between Steps ST62, 63 and Steps ST64, 65. In this manner, the character string can be detected more reliably.

When the character string has been detected in this Step ST65, the procedure proceeds to Step ST66. When the character string has not been detected, this means that no character string which makes it possible to identify the video data as being recorded is detected. In this case, the disk is identified as not being a DVD-video disk and the processing is terminated.

When the procedure proceeds from Steps ST62□|ST65 to Step ST66, the character string of "VIDEO_ST" which makes it possible to identify the video data as being recorded is detected. In this case, the disk from which the data has been read is identified as a DVD-video disk, and the identification result flag is set. Then, the identification is terminated.

As described above, when the video data is recorded, the data is read from the sector into which the character string which makes it possible to identify the video data as being recorded is recorded. Then, the character string for indicating that this video data is included is detected. Based on the result of the detection, the identification as to whether or not the disk is a DVD-video disk can be made correctly.

In the above-described case, the detection of the character string is started from 31st or 47th sector, because the character string which makes it possible to identify the video data and the like as being recorded is recorded at a predetermined position in plural sectors each including the "Path Table". If the position of the character string is not fixed, the data can be read from the leading end of the sector, and it is identified whether or not this is data of the character string for indicating that the video data is recorded. In addition, the sector from which the data is stored is not limited to the sector including the "Path Table", but may be read from any other sectors as far as they have data of the character string for indicating that the video data is recorded.

Figure 20:
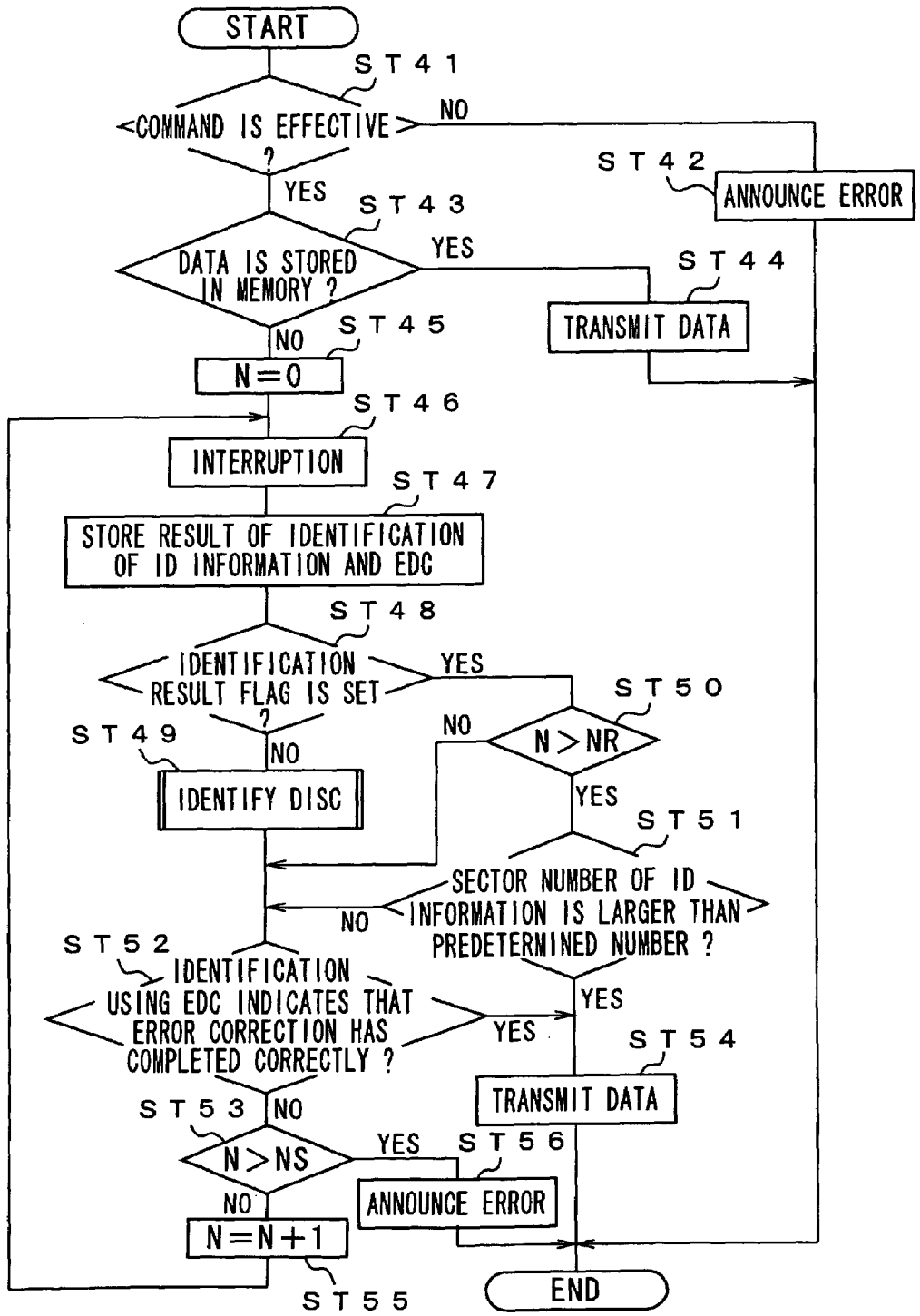
FIG. 20 is a flow chart showing a data reproducing operation.

When the identification is terminated, the procedure proceeds from Step ST49 to Step ST52 as shown in FIG. 20. When the procedure proceeds from Step ST48 to Step ST50, in Step ST50, it is identified whether or not the number of times N of retries becomes larger than the predetermined number of times NR. When the number of times N of retries becomes larger than the predetermined number of times NR, the procedure proceeds to Step ST5 1.

When the number of times of retries N is not larger than the predetermined number of times NR, the procedure proceeds to Step ST52.

In Step ST51, based in the ID information stored in Step ST47, it is identified whether the data read from the DVD-video disk is data of information about reproduction or data for reproducing images and the like. When data of information about reproduction, for example, data of volume descriptors or file structure is recorded within the range of the physical sector numbers of "3000h" to "kh", it is possible to identify whether the read data is data of information about reproduction or data for reproducing images and the like, depending on whether or not the physical sector number of "RSh" of the stored ID information is larger than the sector number of "kh". When the physical sector number of "RSh" of the stored ID information is not larger than the physical sector number of "kh", the procedure proceeds to Step ST52. When the physical sector number of "RSh" of the stored ID information is larger than the physical sector number of "kh", this means that the data stored in the RAM 68 is data for reproducing images and the like stored in the DVD-video disk, and the number of times of retries becomes larger than the predetermined number of times NR. In this case, the requested data is read from the RAM 68 in Step ST51, and is supplied into the computer apparatus. Then, the processing for the command is terminated.

In Step ST52, based on the result of identification using the EDC, it is identified whether or not the error correction has been completed, as well as whether or not the error correction has been performed correctly. When the error correction has not been completed correctly, the procedure proceeds to Step ST53. When the error correction has been completed correctly, this means that the data stored in the RAM 68 is correct data. In this case, the data requested in response to the command from the computer apparatus is read from the RAM 68 in step ST 54, and is supplied to the computer apparatus. Then, the processing for the command is terminated.

In step ST53, it is identified whether or not the number of times N of retries becomes larger than the predetermined number of times NS. When the number of times N of retries is not larger than the predetermined number of times NS, the procedure proceeds to Step ST55 where "1" is added to the number of times N of retries to produce a new number of times of retries. Then, the procedure returns to Step ST 46 where the data is again read from the disk. When the number of times N of retries is larger than the predetermined number of times NS, the data cannot be read correctly, and the disk is not a DVD-video disk. In this case, an error is announced to the computer apparatus in Step ST56, and then the processing for the command is terminated.

As described above, in the processings shown in FIGS. 20 and 21, when a request for reading data from the computer apparatus is made and the data of 16 sectors is read from the physical sector number of "30100h" in which data of information about reproduction is recorded, it is automatically identified whether or not the disk from which the data has been read is a DVD-video disk in which video data is recorded. When the disk is identified as a DVD-video disk in which video data is recorded and the data is read at the number of times larger than the predetermined number of times NR, if it is identified that the error correction for the read data cannot be completed correctly, the data is supplied to the computer apparatus. When the disk is not identified as a DVD-video disk in which video data is recorded and the data is read at the number of times larger than the predetermined number of times NR, if it is identified that the error correction for the read data cannot be completed correctly, an error is announced to the computer apparatus.

Therefore, it is possible to reproduce images without interruption by reducing the predetermined number of times NR at the time when the disk is identified as a DVD-video disk to be smaller than the predetermined number of times NS. Even if the disk is not identified as a DVD-video disk or the read data is control data, the probability of reading data correctly can be increased by increasing the predetermined number of times NS. In addition, an error is announced when the data cannot be read correctly. In this manner, in the case of the DVD-ROM disk for example, only correct data can be supplied to the computer apparatus.

In the above-described embodiment, the requested data is read in response to the supplied command. When the detection flag is not set, the disk identification is automatically performed if the data read in the disk identification in Step ST49 is data of 16 sectors counted from the physical sector number of "30100h". Alternatively, the data of 16 sectors counted from the physical sector number of "30100h" is read when the disk is mounted to the disk reproducing apparatus to make identification whether or not the disk is a DVD-video disk, and the result of the identification is stored. In this case, in Step ST48, the stored identification result is used. In this manner, it is also possible to supply data in response to the command, as is the case described above.

Furthermore, in the embodiment described above, the operation of supplying data is switched based on the result of the identification of the disk. Alternatively, the result of the identification of the disk may be utilized in other operations.

It is assumed here that the control on the rotation of the spindle motor is switched based on the result of the identification of the disk. For example, when the disk is identified as a DVD-video disk, this disk is intended for video reproduction and there is no need for reading the data at high speed. Therefore, the disk is rotated at a normal speed, thereby preventing an increase in power consumption and decreasing the sounds created by the operations of the disk apparatus. When the compact disk is not identified as a DVD-video disk, the data is read in the state where the disk is rotated at a speed higher than a normal speed, thereby increasing the data transition rate. As a result, the data can be efficiently processed in the computer apparatus.

It is possible to switch the amount of data which is read beforehand based on the results of disk identification. As to a DVD-video disk, there are many cases where the data recorded for use in reproducing images and the like is sequentially read. Therefore, when the disk is identified as a DVD-video disk, the amount of data which is read beforehand is increased. In this manner, the read data can be efficiently processed, and in addition, the interruption of the images for example can be prevented.

On the other hand, as to the DVD-ROM in which computer data is stored, there are many cases where the data is read at random. In such cases, reading of the data beforehand may not be effective. There are also some cases where various control parameters are required in order to shorten the access time. For these reasons, the amount of data which is read beforehand is reduced. As a result, the data can be read efficiently, without reading unnecessary data. Furthermore, by performing the retry in the state where the rotation speed of the disk and the conditions of reading data are changed, the probability of reading the data in a correct manner can be increased.

The control on the operations based on the result of identification of the disk has been illustrate only for the purpose of exemplification, and the present invention is not limited to the operation control described above.

INDUSTRIAL APPLICABILITY

As has been described above, the method for identifying optical disks, method for reproducing optical disks, and an optical disk apparatus according to the present invention are useful in the case where plural kinds of optical disks in which data with different contents from each other are reproduced, and are especially useful in the case of reproducing optical disks in which data required to have high reliability such as computer data are stored, and optical disks in which data putting priorities on keeping transmission rate to keep continuity are recorded such as video data.

The invention claimed is:

1. A method for reproducing data stored on an optical disk, comprising the steps of:

identifying the type of data stored on the optical disk by determining if data at a predetermined position on a logical format in a data zone, obtained by reproducing the optical disk, includes predetermined data, and identifying whether the type of predetermined data is data about reproduction or data for reproducing images;

detecting an error in the data obtained by reproducing the data stored on the optical disk; and switching a processing for responding to the error detection by switching a number of times, or a period of time the data is reread until correct data is obtained based on the result of the identification.

2. An apparatus for reproducing data stored on an optical disk, comprising:

a processor configured to identify the type of data stored on the optical disk by determining if data at a predetermined position on a logical format in a data zone, obtained by reproducing the optical disk, includes predetermined data, and identifying whether the type of predetermined data is data about reproduction or data for reproducing images;

wherein the processor is further configured to detect an error in the data obtained by reproducing the data stored on the optical disk, and to switch a processing for responding to the error detection by switching a number of times, or a period of time the data is reread until correct data is obtained based on the result of the identification.

* * * * *